(12) United States Patent
Elberbaum

(10) Patent No.: US 9,018,803 B1
(45) Date of Patent: Apr. 28, 2015

(54) INTEGRATED SPDT OR DPDT SWITCH WITH SPDT RELAY COMBINATION FOR USE IN RESIDENCE AUTOMATION

(71) Applicant: Elbex Video Ltd., Tokyo (JP)

(72) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 14/045,877

(22) Filed: Oct. 4, 2013

(51) Int. Cl.
*H01H 9/00* (2006.01)
*H01H 11/00* (2006.01)

(52) U.S. Cl.
CPC *H01H 9/00* (2013.01); *H01H 11/00* (2013.01)

(58) Field of Classification Search
CPC ............................... H01H 9/00; H02J 13/0065
USPC .................................................. 307/113, 115
See application file for complete search history.

(56) References Cited

U.S. PATENT DOCUMENTS

| | | | |
|---|---|---|---|
| 5,923,363 A | 7/1999 | Elberbaum | |
| 6,603,842 B2 | 8/2003 | Elberbaum | |
| 6,940,957 B2 | 9/2005 | Elberbaum | |
| 7,432,788 B2 | 10/2008 | Glukh et al. | |
| 7,461,012 B2 | 12/2008 | Elberbaum | |
| 7,639,907 B2 | 12/2009 | Elberbaum | |
| 7,649,727 B2 | 1/2010 | Elberbaum | |
| 7,864,500 B2 | 1/2011 | Elberbaum | |
| 7,956,492 B2 * | 6/2011 | Lee et al. | 307/38 |
| 7,973,647 B2 | 7/2011 | Elberbaum | |
| 8,041,221 B2 | 10/2011 | Elberbaum | |
| 8,117,076 B2 | 2/2012 | Elberbaum | |
| 8,148,921 B2 | 4/2012 | Elberbaum | |
| 8,170,722 B1 | 5/2012 | Elberbaum | |
| 8,175,463 B2 | 5/2012 | Elberbaum | |
| 8,269,376 B1 * | 9/2012 | Elberbaum | 307/115 |
| 8,278,839 B2 | 10/2012 | Salvestrini et al. | |
| 8,331,794 B2 | 12/2012 | Elberbaum | |
| 8,331,795 B2 | 12/2012 | Elberbaum | |
| 8,340,527 B2 | 12/2012 | Elberbaum | |
| 8,344,668 B2 | 1/2013 | Elberbaum | |
| 8,384,249 B2 | 2/2013 | Elberbaum | |
| 8,442,792 B1 | 5/2013 | Elberbaum | |
| 8,489,469 B1 | 7/2013 | Elberbaum | |
| 2007/0188025 A1 | 8/2007 | Keagy et al. | |
| 2008/0196936 A1 * | 8/2008 | Yamamoto et al. | 174/520 |
| 2008/0290990 A1 | 11/2008 | Schaffzin et al. | |
| 2010/0278537 A1 * | 11/2010 | Elberbaum | 398/112 |
| 2013/0183043 A1 | 7/2013 | Elberbaum | |

OTHER PUBLICATIONS

International Search Report and Written Opinion of the International Searching Authority dated Dec. 19, 2014 from corresponding Application No. PCT/US2014/058598.

* cited by examiner

*Primary Examiner* — Jared Fureman
*Assistant Examiner* — Joel Barnett
(74) *Attorney, Agent, or Firm* — Katten Muchin Rosenman LLP

(57) ABSTRACT

Method and apparatus for integrating one of single and plurality of hybrid SPDT or DPDT switch with one of SPDT and DPDT relay via contactors structured to connect the poles of the relay and the switch directly or via conductive structures including PCB assembly, for operating electrical appliances via the switch manual key and remotely by powering the relay coil having latching or non-latching armature, with a CPU program providing the manual key and the manual keys of each SPDT or DPDT connected in a traveler lines to the integrated switch-relay to switch on-off group of loads and all the loads of home automation network or grid via optical cable, RF, IR in line of sight and bus line.

23 Claims, 15 Drawing Sheets

Prior art

FIG. 4A
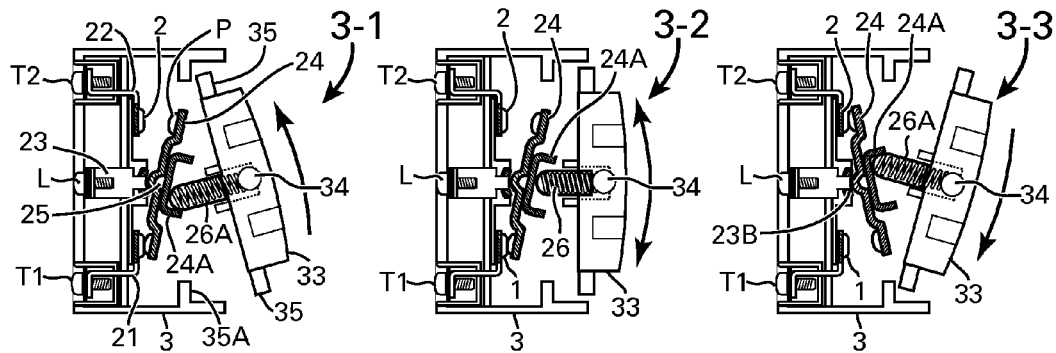
FIG. 4B
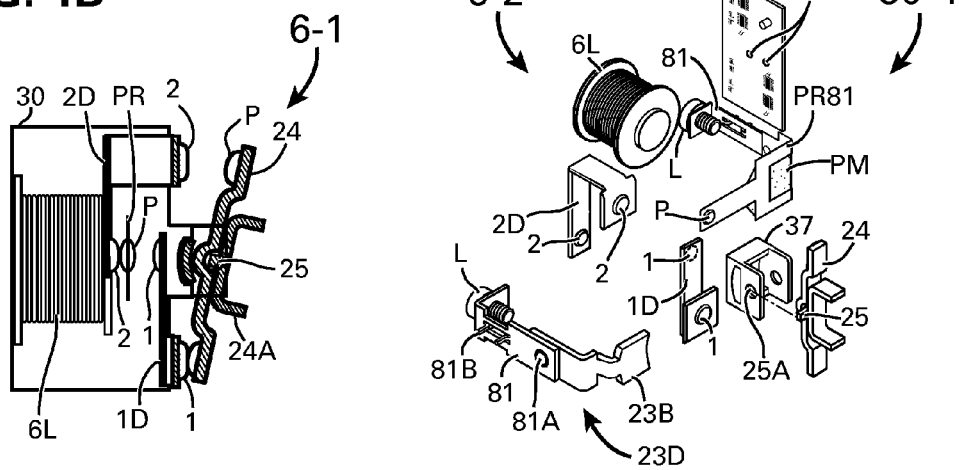
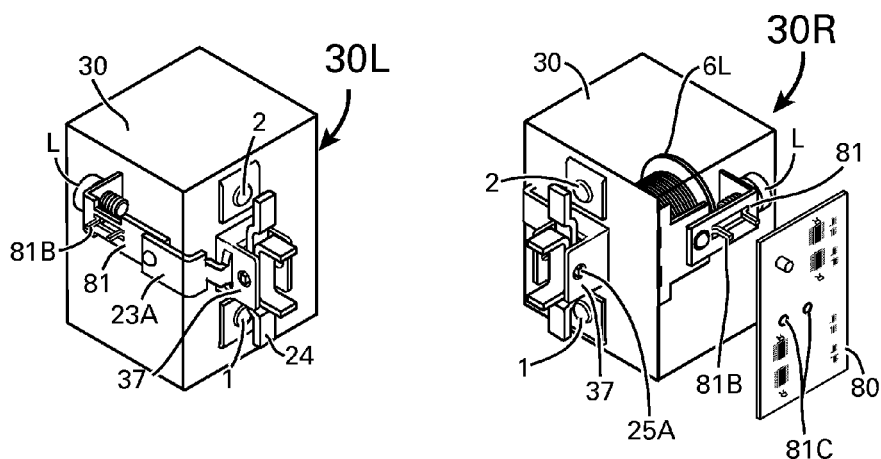

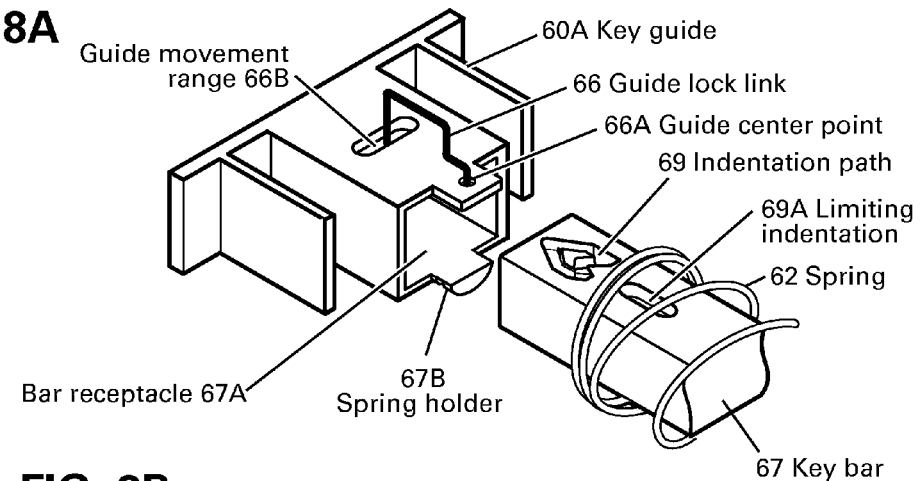
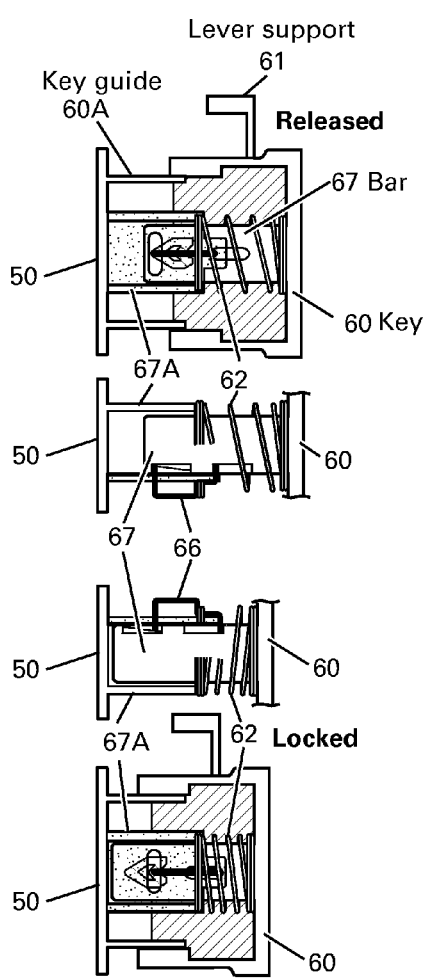
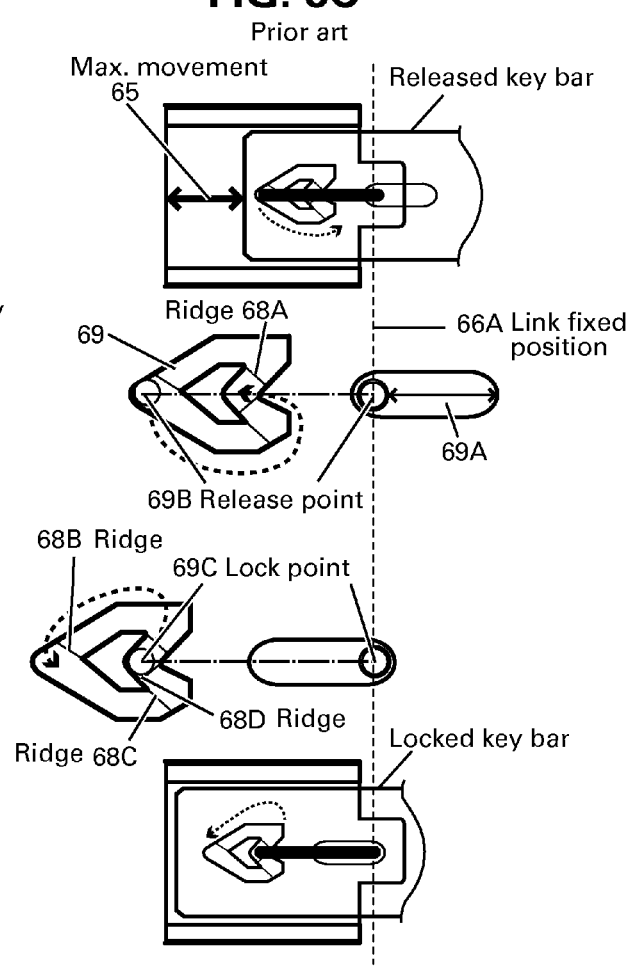

Released | Push to lock | Locked

Released | Push to lock | Locked | Push to release | Released

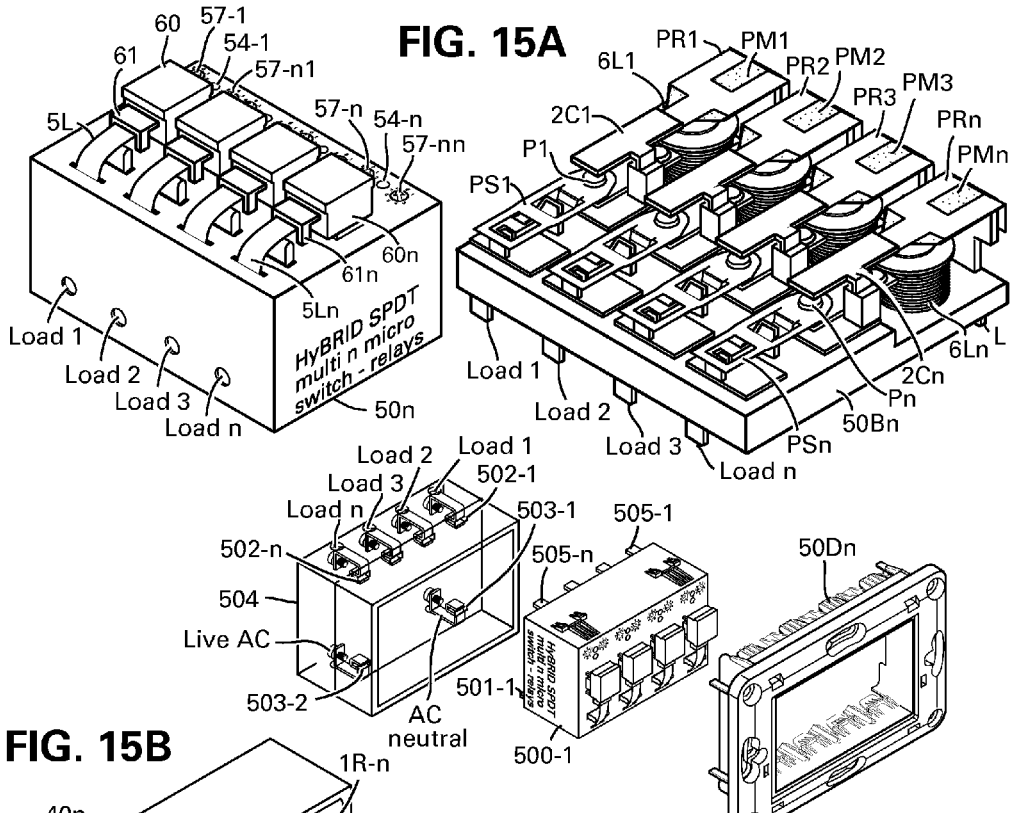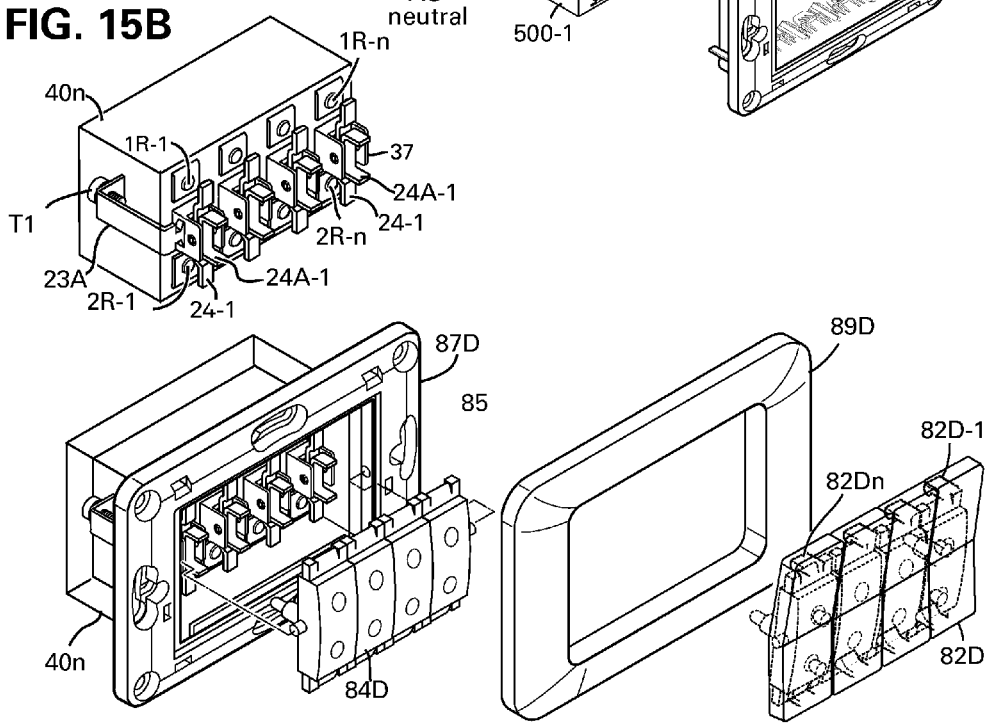

INTEGRATED SPDT OR DPDT SWITCH WITH SPDT RELAY COMBINATION FOR USE IN RESIDENCE AUTOMATION

BACKGROUND OF THE INVENTION

1. Field of the Invention

This invention is related to electrical automation devices including switches and relays for manual and remote operation of appliances in residences and other buildings.

2. Description of the Prior Art

Switches and relays for switching on-off electrical appliances such as water boiler, air conditioners, heaters, lights and any other electrical equipment and appliances in residences, offices, public building, businesses, restaurants and factories are very well known. The well known relay devices for home automation are commonly installed in the main or a sub electrical cabinet of a given premises. The installed relays are operated via bus lines, RF, or by control signal propagated via the AC power line.

The costs of the prior known automation devices and relays including their installation are very high because the electrical wiring must be changed from its standard commonly applied wiring systems, in which the electrical power is fed via the commonly installed switches in the electrical wall boxes. This is in clear contrast to the electrical direct feed from the main or sub electrical cabinet via the relays. For controlling the relays in the electrical cabinets, the commonly used standard switches are replaced by control switches, propagating electrical signals, RF signals, AC power line signals and in some instances IR signals in open air to reach and operate the relay's control circuits in the electrical cabinets.

Such fundamental basic change in the structured electrical systems became too complex, costly and moreover the complexity is the cause for serious repeated malfunctions of the installed electrical automation systems. Further, the known home automation devices do not report the power consumed by the individual electrical appliances and do not provide usable data for reporting statistics to the home owners, nor to the yet to be born "smart grid".

The U.S. Pat. No. 7,649,727 introduced a new concept whereby single pole dual throw (SPDT) relay connected to a commonly used SPDT switch or dual poles dual throw (DPDT) switch enabling to switch the electrical appliances or lights manually via the commonly installed switch and remotely via the home automation controller. The SPDT and DPDT switches are known also as two way or four way switch respectively.

Further, the U.S. Pat. Nos. 7,639,907, 7,864,500, 7,973,647, 8,041,221, 8,148,921, 8,170,722, 8,175,463, 8,269,376, 8,331,794, 8,331,795, 8,340,527, 8,344,668, 8,384,249, 8,442,792 and US publication 2013/0183043 disclose home automation controls, connections, switches and relays for operating electrical appliance via the devices being an add such as the SPDT and DPDT relays or current drain adaptors.

The referenced US patents further disclose in details the reporting of the power consumed by the appliances through the relays or through AC outlets and plugs or through the current drain adaptors. The current drain or power consumption reports are communicated via optical signals through plastic optical fiber cables known as POF or lightguide, via IR or RF in open air, and via electrical signals through bus lines or other networks directly or via command convertors.

The above listed US patents and many pending applications in other countries disclose an add on or a combination of separate SPDT or DPDT switches and/or power sockets and/or current sensing adaptor combinations, which all teach substantially advanced residence and other building automation.

Yet, there is a need for a single automation device comprising a combination of a switch and a relay including the sensing, calculation and reporting power consumption circuits, structured within the sizes and shapes of current day commonly used AC switches at a lower cost than current day automation devices and providing further installation ease and simplicity.

SUMMARY OF INVENTION

The main object of the present invention therefore is to provide for a small size combination of SPDT or DPDT switch, an SPDT relay and power consumption measuring and reporting circuit, constructed to be similar to a shape and a size of a commonly used AC switch, referred to hereafter as a "standard AC switch", that is mounted into a standard electrical wall box, such as the known 2×4" or 4×4" wall boxes in the US, or such as 60 mm round European electrical wall box or other rectangular electrical boxes as used in Europe for installing plurality of standard AC switches and AC outlet/sockets.

Another object of the present invention is to integrate the combined switch, combining the AC SPDT or DPDT switch with an SPDT relay and power consumption calculation circuit, refer to hereafter and in the claims as a "hybrid switch", into the residence automation system disclosed in the referenced US patents and patent application for controlling the hybrid switch and for reporting the power consumed via the hybrid switch through a video interphone system or a shopping terminal and/or via a dedicated automation controller or control station. The video interphones are disclosed in U.S. Pat. Nos. 5,923,363, 6,603,842 and 6,940,957 the shopping terminal is disclosed in U.S. Pat. Nos. 7,461,012, 8,117,076 and 8,489,469.

Another practical objective attained by the present invention is to provide the hybrid switch with a structure that can be fitted with different key levers and the freedom to select any from the wide variety of levers and decorative covers and frames including variety of design and colors that are available and are being regularly introduced to the construction/electrical industry by the different switches manufacturers. Hence, this invention solves the difficulties experienced to match such wide range of available AC switch designs, their panel colors and decorations.

Three types of switches for AC appliances and light fixture are commonly used; a single pole-single throw (SPST) and a single pole-double throw (SPDT) switch. The SPST switch is a basic on-off switch and the SPDT is a change over switch. The SPDT switches are used for on-off switching of a given appliance such as light fixture from two separate positions, such as from the two entrances of the same hall or a room.

In instances were three or more switches are needed to switch on-off the same light fixture of a given hall or room, another type of dual pole-dual throw (DPDT) switches are used. The DPDT switch or plurality of switches are connected in a given straight-cross configuration in between the two SPDT switches described above. The DPDT switches are also known as "reversing" switches.

As will be explained later, the two SPDT switches including the one or more DPDT switches connected in a continuous traveler configuration provide for each individual switch to operate on its own, regardless of the other switches status. Therefore any of the switches that are connected in such SPDT and/or DPDT setup configuration will switch on and off the light fixture irrespective of the other connected switches status. This further means that there is no specific on or off position for any of the connected switches levers, and the switching on or off is achieved by the pushing of the switch lever to its opposite position, or by pushing a push on-push off key.

Accordingly the object of the present invention is to connect hybrid switch comprising an SPDT relay to an SPDT or DPDT switch that are connected for operating a light fixture or other electrical appliance, thereby maintaining the operation via a "commonly used" manual switch and provide remote switching via the SPDT relay of the hybrid switch, or for operating the light fixture via a chain of DPDT and SPDT switches as commonly used and provide the same remote switching via the SPDT relay of the hybrid switch.

Another object of the present invention is to provide for connecting DPDT relay for remotely switching on-off light fixture or other electrical appliance that are connected to manual SPDT switches and to a more comprehensive switching setup that includes two SPDT and one or more DPDT switches.

Chain connected SPDT and DPDT switches of a home automation system of the prior art made it impossible to identify the on-off status of the appliance such as light fixture, unless the data of all the switches and relays status of a given circuit are transmitted to the controller. This mandates the recording and updating of all the manual switch's positions and the relay's data to the controller. This presents a complicated data handling and ensuing operational complications, requiring the transmitting of all the data every time a manual switch or relay is activated at random in the system, and this in return introduces substantial more data traffic and processing.

For this reason the other important object of the present invention is the introduction an AC current sensor into the hybrid switch for identifying when the appliance is switched on and for processing data pertaining the power consumed by the appliance. This is achieved by the introduction of a current sensor such as toroidal or specifically structured current transformer, or by a low ohmic metal alloy connected in line with the AC live line, or by a magnetic hall sensor or any other element that can generate output signal corresponding to the level of the current drain through the live AC terminal.

The output signal level of the current sensor is measured in mV units and is amplified to a level that can be processed by a CPU, with both an amplifier and the CPU are included in the hybrid switch for generating the drained current data, or the power consumed data, or the on-off status data and combinations thereof.

The hybrid switch of the present invention includes a transceiver for receiving commands to operate the relay and for transmitting the data pertaining the status of the appliance, the power consumed or the current drain. The data is processed on the basis of the identified appliance, the level of the AC current drained through the current sensor timed versus the voltage reference throughout the sinusoidal curve of the AC power as measured by the CPU.

The received commands and transmitted data are fed via a communication network selected from a group consisting of wired network such as bus line, optical network or grid of optical cables, two way IR network, RF wireless network and combinations thereof.

The transceiver of the hybrid switch communicates at least one way of two way or bidirectional signals with the home automation controller, the video interphone or the shopping terminal. The transceiver and the CPU are programmed to respond to a power-on command to the connected appliance with a reply that a power-on is acknowledged, or respond to an inquiry pertaining status, current drain and the power consumed by the appliance, thereby updating the home automation controller, or said video interphone or the shopping terminal described in above referenced US patents, or respond with "off status" if the command was to switch off the appliance.

The reference to home automation controller hereafter is to a display device with control keys, touch icons or touch screen and circuits similar to the video interphone and/or the shopping terminal disclosed in the applications and the US patents referred to above.

The terms "hybrid switch" and "hybrid switch relay" hereafter and in the claims refers to the integrated combinations selected from a group of SPDT relay, DPDT relay, DPDT reversing relay with SPDT switch, DPDT switch and reversing DPDT switch of the preferred embodiment of the present invention.

The term "SPDT hybrid switch" refers to a stand-alone switching device for operating a given load manually and remotely.

The term "DPDT hybrid switch" refers to a stand-alone switching device for operating a load in a wet or humid environment, such as bath room or laundry area by switching manually and remotely the two poles of a load, namely the live AC and the neutral AC.

The terms "reversing hybrid switch", "crossing hybrid switch" and "reversing DPDT hybrid switch" refer to a switching device for a given load that is switched on-off via the reversing hybrid switch and via at least one SPDT switch and/or via an intermediate n DPDT switches all connected in a cascaded chain of dual traveler lines, with each of the connected switches can operate the given load, or switch it on-off.

The term "contactor" hereafter and in the claims refers to a conductive supporting structure that includes dual contacts as used for the SPDT and DPDT hybrid switches, or to a conductive supporting structure that includes triple contacts as used for the reversing DPDT hybrid switches, or to the contacts of an SPDT or DPDT relay and SPDT or DPDT switch connected between them via internal connections, such as a PCB (printed circuit board) or other conductive structures.

BRIEF DESCRIPTION OF THE DRAWINGS

The foregoing and other objects and features of the present invention will become apparent from the following description of the preferred embodiments of the invention with reference to the accompanying drawings, in which:

FIG. 4A shows the prior art elements and operation of the well known toggle or rocker electrical switch;

FIG. 4B is a cut, exploded and perspective views showing an SPDT rocker switch and the SPDT relay of FIG. 3B with a modified structures, contactors, contacts and terminals for integrating another SPDT hybrid switch-relay of the present invention;

FIGS. 8A~8C are perspective and cut views showing the lock-release structure of the prior art as used for the hybrid SPDT and DPDT micro switches-relay of the present invention;

FIGS. 15A and 15B show illustrative structures and casings of plurality of hybrid switches integrated into a casing size and shape that can also be plugged into socket enclosure with wiring terminals and control circuit (the control circuit not shown).

DETAILED DESCRIPTION OF THE PREFERRED EMBODIMENT

Figure 1A:
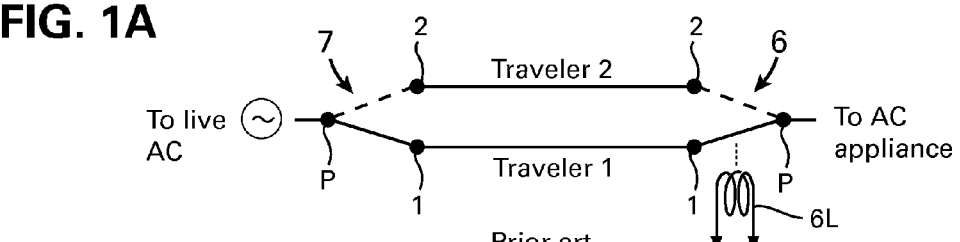
FIGS. 1A and 1B are electrical drawings, connections and illustrations of the electrical SPDT relay and SPDT switch for operating AC appliances of the prior art.

FIG. 1A Shows an electrical circuit comprising a single pole double throw (SPDT) AC switch 7 connected to an automation SPDT relay 6 operated by a relay coil 6L of the prior art such as disclosed in the U.S. Pat. No. 7,649,727. The circuit is a variation of a well known circuit for connecting two traveler wires between two traveler terminals 1 and 2 of two SPDT AC switches for switching on-off lights from two distinct places within the premises, such as switching a corridor's light from two ends of the corridor. The SPDT switches are also known as two-way switches, and are well established for many years.

Figure 1B:
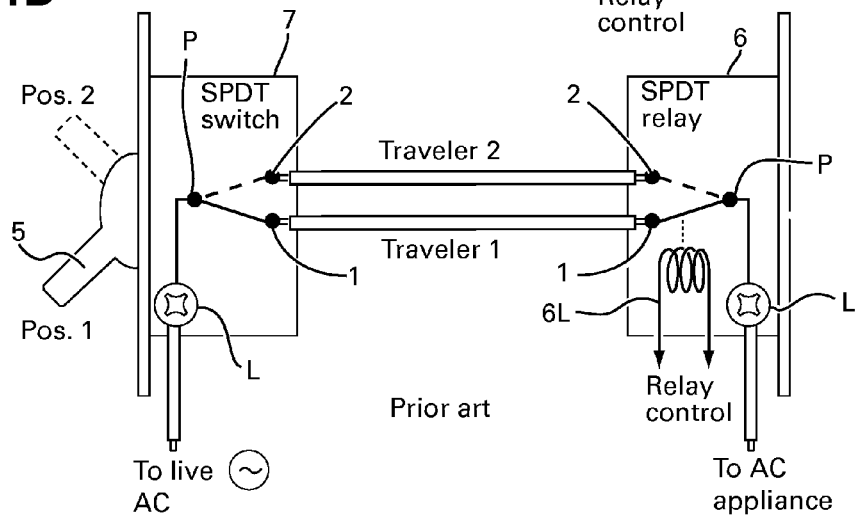

The prior art combination of SPDT switch 7 and the SPDT relay 6 shown in FIG. 1B were introduced in the reference patent U.S. Pat. No. 7,649,727 and other referenced US patents, reciting a new electrical automation concept for simplifying the electrical home automation wiring in residential and other buildings. The combination of SPDT switch and SPDT relay enabled to maintain the electrical wiring in its common traditional structure, contrary to the prevailing home automation system mandating the introduction of the automation relays into the main electrical cabinets of the premises.

The only change to the existing wiring and switches by the new concept are the add-on SPDT relay 6 and the replacing of the traditional on-off light switch, known as single pole single throw (SPST) switch, to an SPDT switch. This enabled to operate appliances or lights manually via the traditional mechanical switch lever, and remotely via the relay control.

Each SPDT relay and SPDT switch is overriding the other and both can switch and operate lights or other loads independently and without limitation. This independent operation of the manual switch transformed the automation system to a fail-safe system because the manual switch can be operated when the automation fails for whatever reason. The term load is used hereafter to be any electrical appliance or light.

Figure 1C:
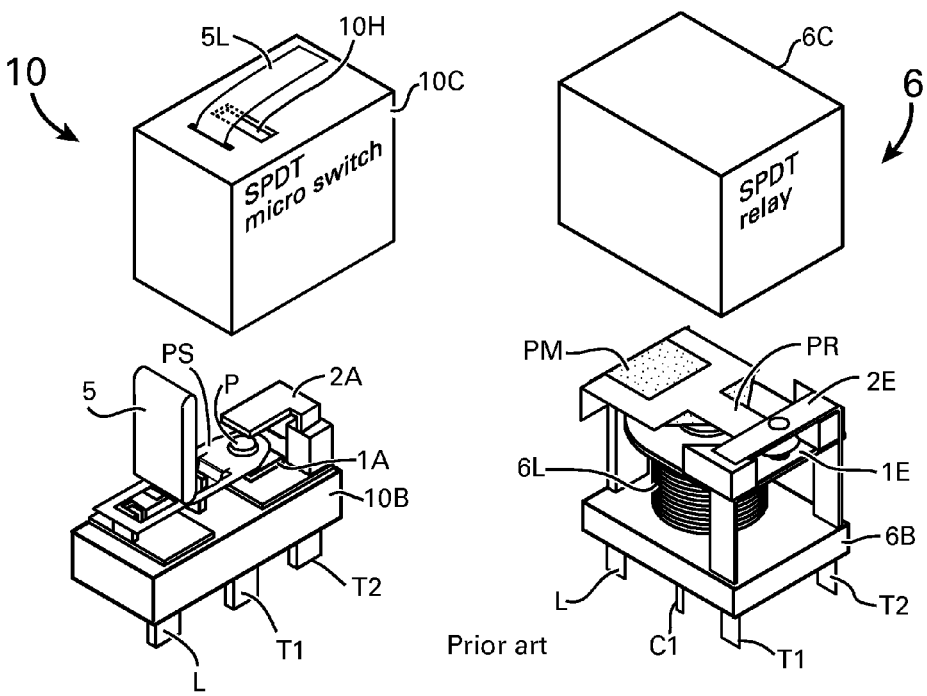
FIG. 1C shows the enclosures or casing and illustrations of electrical SPDT relay and SPDT micro switch for operating AC appliances of the prior art.

FIG. 1C shows an SPDT micro-switch 10 and an SPDT relay 6, both are known electrical devices, manufactured by numerous manufacturers such as OMRON of Japan and many others in many countries. The SPDT micro-switch 10 is shown with its removed cover 10C and with the actuating lever 5L. The plunger or key 5 is shown touching the pole PS shown as touching the non-visible contact 1 of the traveler structured conductor 1A, which connects the pole contact P to the terminal T1. Shown in FIG. 3B the terminal T2 of the structured conductor 2A is connected via contact 2 when the plunger 5 is lifted to release the pole PS and the contact P of the pole assembly PS engages the contact 2.

The SPDT relay 6 including the relay magnetic coil 6L are also shown in FIG. 1C with the relay cover 6C removed. The relay further comprising pole structure PR supported by magnetic alloy based structure PM known as armature. The pole is shown touching the contact 1 of the supporting structure 1E and connecting to terminal T1 but will switch-over to engage contact 2 of the supporting structure 2E when power fed to the coil 6L via the terminals C1 and C2 shown in FIG. 3C is cut.

Figure 3A:
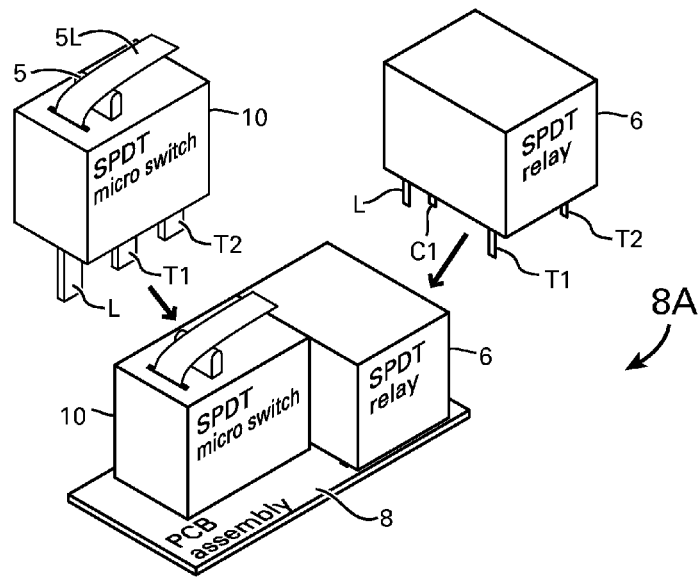
FIG. 3A shows the assembly of the prior art micro switch and relay onto a printed circuit board.

The relay 6 and the micro-switch 10 can be combined as shown in FIG. 3A to provide an integrated or hybrid SPDT switch and relay by soldering the relay 6 and switch 10 onto the shown PCB 8. While such an integration is the object of the present invention, attaching and soldering the two devices onto a PCB or other conductive structures is one solution. For an integrated or hybrid two way switch-relay the combining of the switch-relay onto the shown PCB is one embodiment but it is not the preferred embodiment of the present invention. This will be discussed later.

The relay terminals T1, T2 and L including the shown C1 and C2 (shown in FIG. 3C) coil terminals are fixedly mounted under the relay body 6B for connecting the terminal T2 of the relay 6 with T2 of the SPDT switch 10, T1 of the relay 6 with T1 of the switch 10 while the L (Line) terminal of the relay is connected to the AC appliance shown in FIGS. 1A and 1B and the L terminal of the switch is connected to the AC live line.

The AC line and the appliance connections may be reversed as will be explained later. However, when the T1 and T2 terminal of the SPDT relay and the SPDT switch are connected to each other, it is clear advantage that two only remaining connection terminals of the integrated switch and relay are the L terminals for connection to a load and the AC live line as it cuts time and labor.

The combined SPDT switch and SPDT relay cannot be used for connecting two traveler wires to another SPDT switch or relay because only a single L terminal is provided for connecting a load. To connect two SPDT switches or more than two switches in a cascaded line of switches for operating a given load require cascaded connections of dual traveler lines between reversing dual pole dual throw DPDT that are formed into cross or reversing switches as shown in FIG. 2A.

Figure 2A:
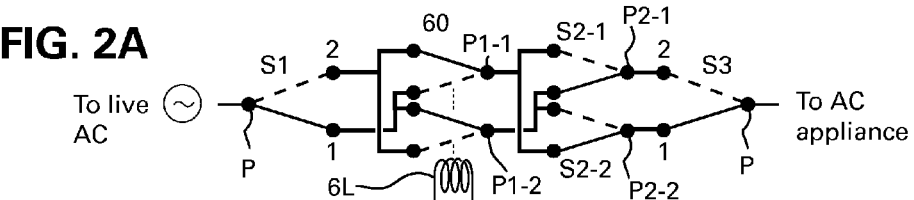
FIGS. 2A~2C show an electrical drawing including illustrated drawings of the add-on DPDT relay designed and structured into casing for attachment to SPDT switches of the prior art as used in the US.
Figure 2B:
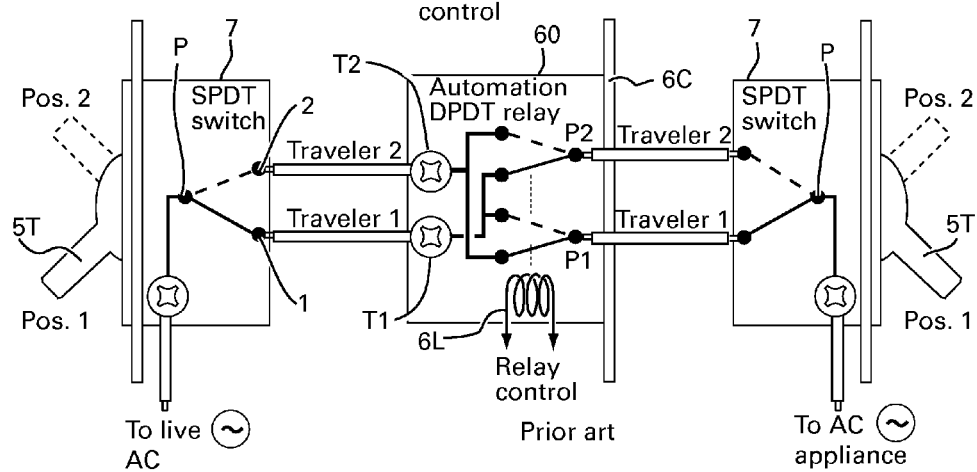
Figure 2C:
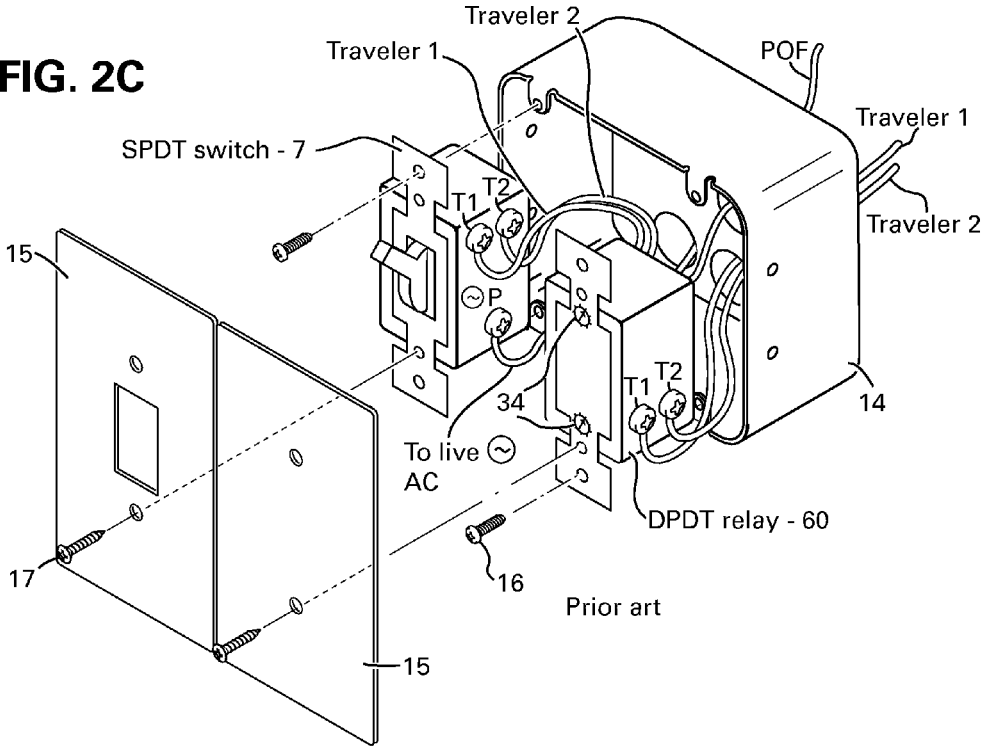

FIG. 2A shows such cascaded switching chain in which a DPDT relay 60, operated by the shown relay coil 6L, is connected through its traveler contacts with the traveler contacts of the two poles P2-1 and P2-2 arranged to reverse the connected lines, the same way the DPDT switch shown as S2-1 and S2-2 operates. In such a cascaded switching line the use of add-on relay 60 shown in FIGS. 2B and 2C is disclosed in the U.S. Pat. No. 7,649,727 and in many other of the referenced US patents. It must be noted that it is possible to connect cross DPDT switch to an add-on SPDT relay but not to the SPDT hybrid relay of the present invention.

In all cases the prior art of adding a separate relay to a switch and/or attaching such relay to a switch as disclosed in the U.S. Pat. No. 8,384,249 mandates labor for connecting traveler wires and/or having to squeeze wires and wiring devices into the very small wall boxes such as half the size or 2"×4" of the box 14 shown in FIG. 2C that is known as US box 4"×4". Installing an add-on relay takes time to do and increases the installation cost. To improve upon the installation efficiency and thereby reduce the installation cost, a combination of an SPDT switch and SPDT or DPDT relay of the present invention are needed.

For combining or integrating an SPDT switch 10 and a relay 6 the simplest method will be to mount then onto a printed circuit board 8 as shown in FIG. 3A. The PCB is also needed to provide for the automation operating and communicating circuits, not shown in FIG. 3A but will be discussed later.

What is clear from the attaching and connecting the SPDT relay 6 to SPDT switch 10 is that this eliminates completely the need to connect the two devices by separate traveler wires. Even though the traveler wires may be just short jumper wires installing the traveler wires takes time and is costly.

The combined switch and relay 8A shown in FIG. 3A is very useful and can be implemented by simple means, the hybrid or the integrated switch 10 and relay 6 as shown in FIG. 3A is not the preferred structure of the present invention which is to further reduce the hybrid switch size and components.

Figure 3B:
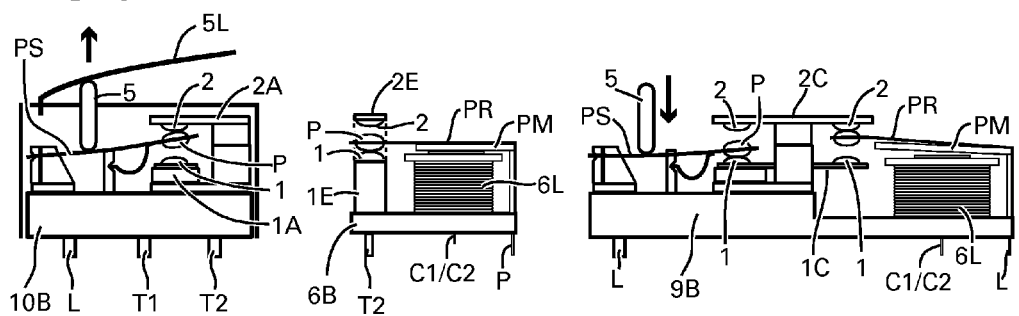
FIG. 3B is a cut view showing the combining or integrating of the SPDT relay and the SPDT micro switch of the present invention.
Figure 3C:
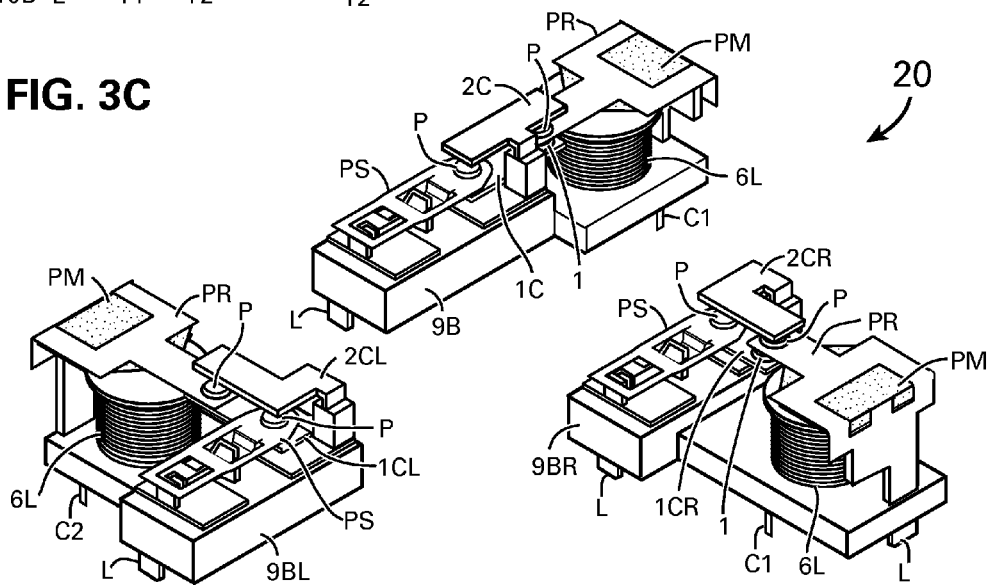
FIG. 3C shows perspective views of the combined structure of the hybrid SPDT switch and relay of the preferred embodiment.

FIG. 3B shows cut views of one of the preferred embodiments wherein the relay body 6B and the micro-switch body 10B are restructured into a new hybrid body 9B that combines the traveler contact support structures 1A, 2A, 1E and 2E into SPDT contactors 1C and 2C and reduce the overall size and cost of such hybrid switch-relay device.

The term contactor refers to a conductive linking structure comprising the straight dual contacts and the reversing triple contacts of the SPDT and DPDT switch and relay.

The two traveler contacts 1 and 2 of the micro-switch 10 are fixed onto a sturdy conductive structure made of brass or similar metal alloy designed to form a complete conductor including contacts 1 and 2 and the terminals T1 and T2 within the molded body 10B of the micro-switch 10. Same applies to the relay's traveler contacts 1 and 2 that are affixed onto two conductive structures 1E and 2E to form a complete conductor including the contacts 1 and 2 and the terminals T1 and T2 molded into the relay body 6B.

As shown the hybrid switch and relay body 9B is integrating the contacts 1 and 2 of both devices and the conductive structures 1A, 2A, 1E and 2E of the switch and the relay into a simple linking contactors 1C and 2C between the two contacts P of the poles PS and PR of the two devices. No traveler terminals are needed as the traveler connections are limited to between the traveler terminals of the switch 10 and the relay 6. This leaves only the two L terminals, one for the switch and one for the relay.

Abolishing the four terminals used for connecting two traveler wires inside the box shown in FIG. 2C, makes the installing of the hybrid switch simpler, cleaner and cheaper.

FIG. 3C illustrates different SPDT micro-switch and relay combinations 20 including the body 9B in a straight combination, 9BR shown as right angle combination and 9BL shown as left angle combination.

As can be seen from all the combined assemblies 9, 9L and 9R the relay-switch structure is simplified, the pole terminal PR and the pole contacts P are shown to be literally the same as the original pole PR. The pole contacts P including the supporting magnetic alloy or armature PM is shown to be the same as the pole structure of the well known relay body 6B. The traveler terminals and support structure 1E and 2E are eliminated and are not used, while the relay coil with the magnetic core 6L including the coil terminals C1 and C2 remain the same.

Figure 6A:
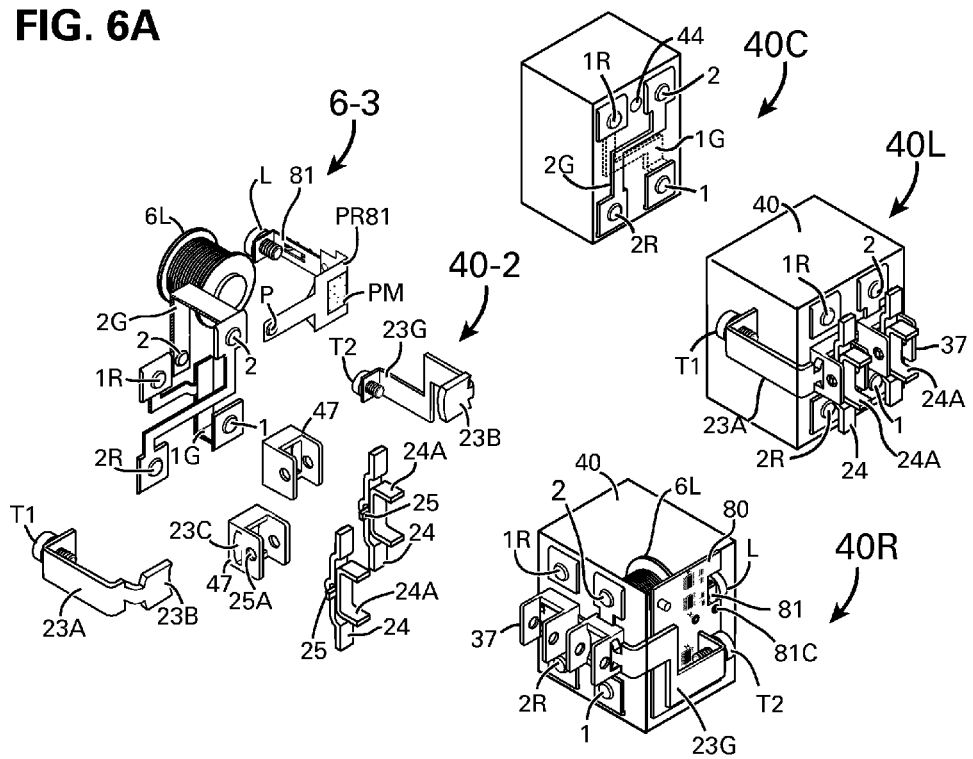
FIG. 6A is an extension of FIG. 4B showing the exploded view and integration of the SPDT relay with the reversing DPDT rocker switch.
Figure 6B:
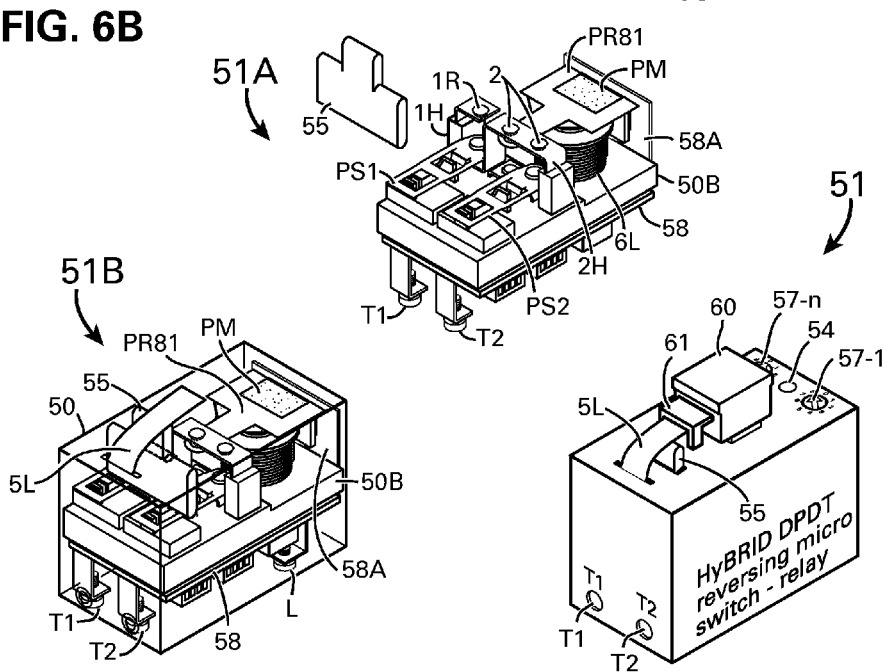
FIG. 6B shows the assembly and casing of the integrated reversing DPDT hybrid micro switch and the SPDT relay of the present invention.

Same applies to the micro-switch body 10B, in which the complex conductive traveler support structure 1A and 2A including the traveler contacts and the terminals T1 and T2 are replaced with the combined simplified contactors 1C and 2C with 1C including dual contacts 1 and 2C dual contacts 2 and the individual bodies 6B and 10B are combined into a single body 9B, in different variations shown as 9B, 9BR and 9BL and a single combined cover such as the shown cover 50 in FIG. 6B.

From the above description it becomes clear that no traveler wires and/or terminal are needed for the hybrid switch-relay of the present invention, and the inner structures of the combined hybrid body are simplified.

The shown cut body 9B in FIG. 3B reproduces the electrical circuit shown FIG. 1A but without the traveler lines and/or traveler terminals. It is obvious that applying power to coil 6L will engage the contact P of the pole PR to the contact 1 of the shown contactor 1C and to contact 1 of the micro-switch and through the pole PS for connecting the AC power through the hybrid switch between the terminals L. Reversing the pole PS position or cutting the power from the coil 6L will switch off the current flow to a connected load (not shown). It should become clear that the hybrid switch or hybrid relay of the present invention can be made compact and simpler to install.

The shown hybrid switch-relay structure in FIGS. 3A, 3B and 3C are all illustrated with the two bases 6B and 10B remain at the bottom of the illustrations and so is the combined bases 9B, 9BR and 9BL. The illustrations were made to show how simple this can be achieved with prior art devices. Similar switch-relay combination are further shown in FIGS. 4B, 6A and 6B using prior art devices to enable simple combinations of hybrid solutions. However, many structural changes can be made to provide improved and yet the lower combinations cost.

The different structures shown in FIGS. 4B and 6A with the relay coils mounted below the base of a switch contact. FIG. 4A illustrates the well known structure of an SPDT toggle or a rocker light or other appliances switch 3. The switch 3-1 shows dual contact-terminal structures 21 and 22 embedded into the switch body 3 and the support terminal 23 for the pole terminal 24. Both terminals 21 and 22 provide the connecting terminals T1 and T2 respectively and the support terminal 23 provide the L terminal or the live AC for the SPDT switch.

The pole terminal 24 is rotating around its center pin 25 and is shown in 3-1 to be engaging contact 1 of T1. The pole 24 is pressured by the piston 26A through the expanded spring 26 providing sufficient pressure for maintaining the contacts P and 1 under highly pressured condition.

When the toggle or the rocker lever 33 that is rotatable around its center pin 34 is being pushed the other way the spring 26 as shown in 3-2 is being compressed inside the piston 26A and the piston-spring combination is moving along the saddle 24A all the way until the piston passes the center point of the saddle 24A. At this point the spring will expand with high pressure to toggle or switch over the pole 24 to the other side for engaging the contact 2 and connecting the L terminal to T2 terminal shown in 3-3, exactly as shown in FIGS. 1A, 1B and 2B.

The switch mechanism and structure shown in FIG. 4A is the main stay of what is known as light switches that are used in literally all lights application, with varying internal structures and with different lever designs or face plate designs. The spring-piston movement however is the common structure for the electrical light switches for many years.

FIG. 4B shows in 6-1 a cut view of the hybrid switch-relay 30 with the relay coil 6L and pole PR placed behind or at the back of the contactor 1D including the contacts 1 and 2 of the switch. The contactors 2D and 1D are shown in the exploded view 6-2 to include two contacts each, combining the dual contacts 1 and dual contacts to engage the contact P of the pole PR and the two switch contacts 1 and 2 to engage the pole 24 of the switch.

The shown P contact of the relay pole PR in 6-1 is touching the contact 2 of the contactor 2D, shown also in 6-2 to include the contact 2 of the switch assembly 30. It is clear from the cut view of 6-1 and the exploded view of 6-2 that though the structure of the switch body 30 is different from the micro switch body 9B shown in FIGS. 3B and 3C, the operations of the micro and rocker/toggle hybrid switch-relays are identical.

For better understanding the limited elements and parts used in the hybrid switch-relay the exploded views 6-2 and 30-4 of FIG. 4B show the contacts and the contactors separated from the other elements. The relay coil 6L shown in 6-2 is drawn back from the pole structure PR81 and the armature of the magnetic core PM that are shown attached to terminal L via a structure 81 that is explained below. Similarly the two contactors 1D and 2D are shown separated from the pole PR81 including the terminal 23D combining the mechanical contact 23B that engages and provide the electrical contact to the pole terminal or structure 24.

The other end of the terminal structure 23D is shown riveted or it can be welded to a low ohmic metal alloy structure 81 that is designed and calculated to have specific resistance values in the mili ohms range. The use of such low ohmic metal alloy in AC power outlets was disclosed in U.S. patent application Ser. No. 13/349,939. The advantages of using such metal structure is the significant reliability, as such metal alloy is not prone to failure as other low ohmic resistors used in current sensing application and its resistance is stable. Other details and explanations to the current drain and power consumption reporting are discussed further below.

The exploded view 6-2 is showing two structures 81, connected to the pole PR81 and to the terminal 23D, however only one is needed in the hybrid switch-relay assembly and only one is used. The shown two structures 81 are to highlight the optional variations in designing and producing such hybrid switch-relay devices.

The other end of the terminal 81 combined with the structure 23D and 23B is the L terminal for connecting the live line or the load. Other structures shown in 30-4 are the holder 37 that provides the access to the contact 23B and the center pivoting holes 25A for supporting the center rotating pins 25 of the pole structure 24.

It should be noted that the holder 37 is not a separate part or component. It is shown in the exploded view and can be used as a separate part, but the molded case 30 of the preferred embodiment hybrid switch structure combines the holder 37, the contactors 1D and 2D, the structure 23B and the terminals L of the relay pole PR or PR81 terminal and the switch pole terminal 23A or 23D, to become a single molded switch body 30.

Figure 5A:
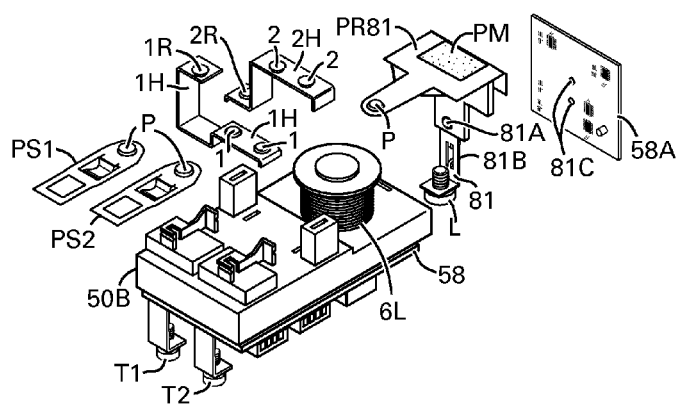
FIG. 5A is an exploded view showing the integrated SPDT relay and a DPDT micro switch including the modified structure of the reversing contactors and terminals.
Figure 5B:
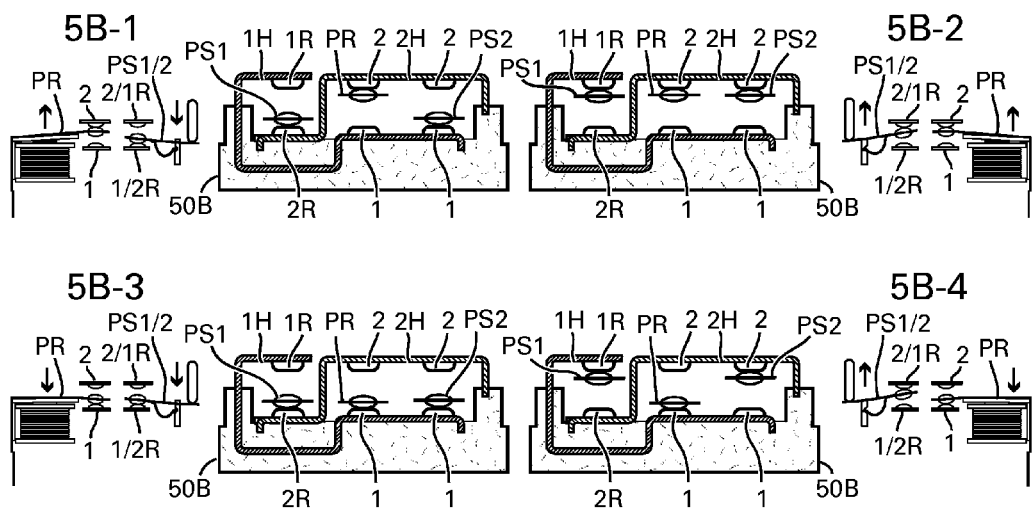
FIG. 5B shows four states of the integrated DPDT contactors with the SPDT relay, highlighting the contacts statuses combinations.
Figure 5C:
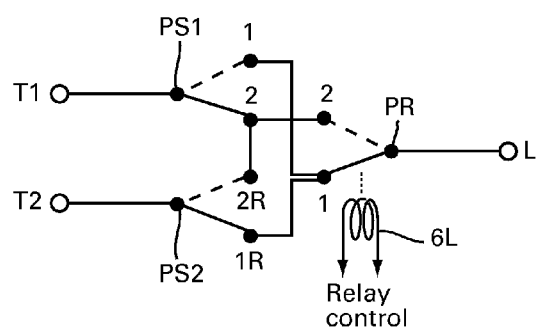
FIG. 5C is an electrical circuit diagram of the integrated contacts of the DPDT or reversing hybrid switch-relay of the preferred embodiment of the present invention.
Figure 12A:
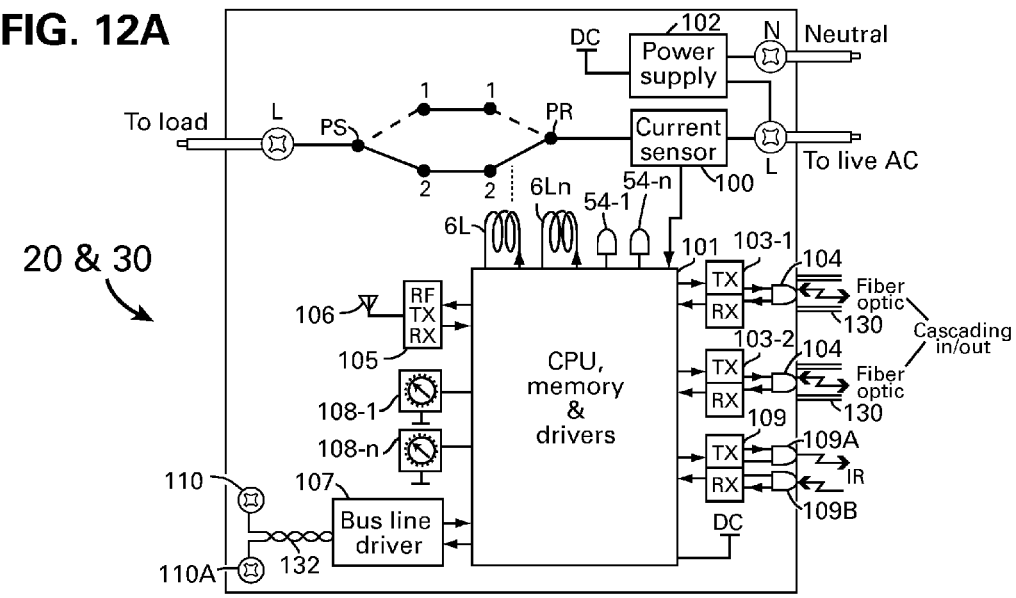
FIGS. 12A~12B are block diagram of the control and communication circuits included in the hybrid SPDT and DPDT switches of the preferred embodiment.
Figure 12B:
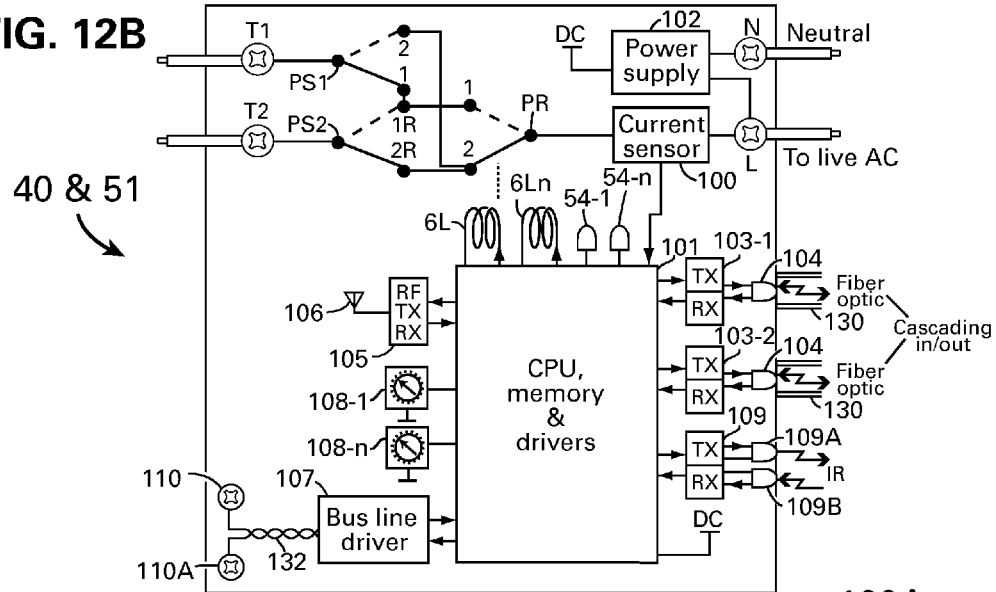

The structures 30 of FIGS. 4B and 40 shown in FIG. 6A do not show an AC neutral terminal needed to provide power to the control circuit, shown in FIGS. 12A–12B. Such neutral terminal is included whenever there is a need for such terminal. The hybrid switch-relay body structure shown in FIGS. 3A–6B are not shown with the neutral terminal to simplify the illustration of combining the associated switch and relay contacts. The shown illustrations in FIGS. 4B, 5A, 6A and 6B show the controlling circuit 80 and 58 and the integration of the control, power consumption reporting and the powering of the relay circuits.

As explained above, the hybrid SPDT relay-switch can be used for manually switching on-off a given load from a single location only. It cannot be connected to another SPDT switch or in a cascaded chain of DPDT switches, known as reversing switches. In such cascaded chain each switch can operate manually the same given load or switch the load on-off from multi locations.

The reason as explained is that the chain connections are made via two traveler wires, with each segment of the chain can be "reversed" independently by the reversing switch. The SPDT hybrid switch-relay, as explained, provides two L terminals, a load terminal and live line terminal. To provide for manual switching of the same given load from multi switches and locations, such as switching on-off light fixture, a DPDT hybrid reversing switch-relay is needed.

Shown in FIG. 6A is the reversing DPDT switch-relay body assembly 40 with the exploded view 40-2 showing the poles, terminals, contactors and other structured items used for the DPDT switch-relay assembly 40.

FIG. 6A also shows the body structure and the details of a reversing DPDT hybrid switch-relay 40. In this DPDT setup the relay 6 uses an identical relay coil and core 6L and identical relay pole structure combining the contact P with the pole PR81, the magnetic alloy or armature PM and the low ohmic alloy structure 81. The connecting terminal T1 of the structure 23A can be used to replace the structure 23D of FIG. 4B, combining the current sensing low ohmic alloy structure portion 81 referred to above and below.

The shown two angles of the DPDT switch 40L and 40R employ two rotating poles 24 and two holders 37, both identical with the rotating pole 24 and the holder 37 of FIG. 4B. The terminals connecting the rotating poles shown as 23A and 23G are used for connecting two traveler wires T1 and T2. Similar or identical terminals can be used with the SPDT hybrid-switch of FIG. 4B. The terminal 23D shown in FIG. 4B could be used with L nomination, i.e., load or live line or it could be the terminal 23A of FIG. 6A with L nomination. For the DPDT hybrid switch-relay the low ohmic alloy structure 81 is shown introduced only to the terminal PR81 shown in 6-3 and in 40R of FIG. 6A is shown behind the PCB 81, soldered via terminals 81B to the PCB at 81C, the amp IC1 input.

The difference between the terminal 23A and 23G used for the DPDT hybrid assembly is the providing the needed distance between the connection terminal T2 and the connection terminal L. For this reason the terminal 23G is structured to shift its terminal T2 away from the terminal L. However it is similarly possible to use for both traveler terminals the identical structure 23A and restructure the pole PR81 by shifting the terminal L into different position within the rear of the DPDT assembly 40R, away from the terminal T2 or from a neutral terminal (not shown).

The shown contacts in the exploded view 40-2 of FIG. 6A comprise two contactors 2G and 1G that are in a way an extended reversing structure of the contactors 2D and 1D of FIG. 4B. Each of the two contactors 2G and 1G is provided with additional contact 2R and 1R respectively. The added two contacts 2R and 1R are shown to the left of the contacts 1 and 2, and are in opposite positions, 2 vs. 1R and 1 vs. 2R, and thus they are reversing contacts.

Similar to the hybrid switch 30L/30R shown in FIG. 4B, the DPDT hybrid switch-relay shown in FIG. 6A is encapsulated into a molded structures 40C, 40L and 40R, combining the exploded view parts and assemblies into one solid molded case 40.

Shown in 40-C are the four contacts 1, 2, 1R and 2R, all molded onto the front surface of the switch-relay assembly, that is shown without the two molded holders 37 that are the holders for the rotating toggle or rocker switch poles 24. The shown molded assembly 40L clearly illustrates how the DPDT manual switch is made to operate through the toggling poles 24. The toggling poles are attached through their center pins 25 into the center pivoting holes 25A.

FIGS. 4B and 6A show a PCB 80 with two mounting holes 81C for attaching and soldering the PCB to the current sensing structure. The PCB is combining the entire control communication and power consumption reporting and is assembled into the small casing as shown in 30R and 40R. The combined small structure provide for assembling the molded switch-relay and its electrical control and communication circuits into a commonly used enclosure or packaged into a size and a shape, that can be installed into a standard or common electrical wall box.

The shown structure 81 made of low ohmic alloy include two solder pins 81B for attaching the structure 81 to a printed circuit board shown. The PCB 80 similar to the shown PCB 58 and 58A of FIGS. 5A and 6B is needed for introducing the control, processing and communication circuits for operating the SPDT relay via its coil 6L and for processing and reporting the current drained and/or the power consumed by the load through the hybrid switch-relay.

FIGS. 5A and 6B show the exploded view and the structures used for combining the contacts of a reversing DPDT micro switch and the SPDT relay. The DPDT micro switch comprising dual poles PS1 and PS2 each with its contact P and the well known support structure embedded or molded into the base 50B. The contact structure or the contactors 1H and 2H are shown in the exploded view.

The contactor 1H comprising dual contacts 1, one for the relay pole PR81 and one for the pole PS2 and a reversed contact 1R for the pole PS1. The contactor 2H comprising dual contacts 2 one for the relay pole PR81 and one for the pole PS2 and a reversed contact 2R for the pole PS1.

The shown body assembly of FIG. 5A further comprising the relay coil 6L, the pole PR81 with the magnetic metal alloy support or armature structure PM and the low ohmic alloy structure 81 riveted to the pole PR81 via a rivet 81A, or otherwise welded to the pole PR. The current sensing structure is soldered to the PCB 58A via the structured solder pins 81B into the corresponding holes 81C of the PCB assembly 58A.

The shown PCB 58, mounted under the body 50B can be an extended PCB or main PCB for the given hybrid relay-switch assembly, or not be needed and the entire control, communication and the power consumption reporting circuits can be mounted onto the PCB 58A.

The terminal L and the two terminals T1 and T2 are identical with the above referred connection terminals. The terminals are all shown in the many drawings to be screw type terminals, however different type of wiring terminals can be used instead. Including such terminals known as self-lock or snap-in without screws, or dual self-lock terminals for connecting the electrical wires in a cascaded chain from one switch to another, or screw type terminals for connecting the cascading electrical wires from one switch to another, or other known terminals used for electrical wiring devices such as switches, power outlets and other mounted and/or wired electrical appliances.

FIG. 5B shows cut views of the contacts of the contactors H1 and H2 that are embedded, molded or otherwise attached to the hybrid body 50B along with four cut views 5B-1~5B-4 of the relay pole PR and the switch poles PS1/2. The switch poles PS1 and PS2 are operating together via the plunger 55 and therefore the contacts of PS1 and PS2 are always shown together engaging the upper 2 plus 1R or the lower 1 plus 2R contacts.

FIG. 5B illustrates the four state combinations 5B-1~5B-4 for the relay pole PR position vs. the switch poles PS1/PS2 positions. It should become obvious from FIG. 5C that two of the four positions provide straight connections to the traveler wires T1 and T2 and the other two reverses or cross the connection, wherein contact 2 of the SPDT relay will connect to pole PS2 or to pole PS1, while contact 1 of the SPDT relay will connect to pole PS1 or to pole PS2. However as the two poles PS1 and PS2 are operated together via the plunger 55 and the two traveler terminals T1 and T2 will be connected in two states, straight and reverse only.

FIG. 5C is the electrical circuit diagram of the reversing DPDT hybrid switch-relay. It must be noted that the known crossing or reversing relays such as shown in the prior art of FIG. 2B intersects cascading pair of traveler wires via two pairs of traveler terminals. Further, a cascaded chain of traveler lines of the prior art uses an SPDT switch and the add-on DPDT or reversing relay, occupying two wall boxes space and many interconnecting wires via the many terminals.

The circuit shown in FIG. 5C does it all via a single hybrid switch-relay device 51 of FIG. 6B, that is packaged into a small case 50 that fits the size and a shape of any known single US or European electric wall box with absolute minimal wiring shown as only three terminals T1, T2 and L shown in FIG. 5A. Not shown is the Neutral wire terminal that is included and discussed later.

The hybrid device 51A of FIG. 6B is showing the assembly of the structures shown in the exploded view of FIG. 5A onto the base 50B using the plunger 55 for operating the dual micro switch poles PS1-PS2.

The same hybrid device 50B is shown encapsulated or packaged into an enclosure or a box 50 for accommodating the assembly 51A, the plunger 55 and the actuating lever of the prior art 5L.

The assembly 51 shows the hybrid DPDT reversing micro switch-relay as a packaged device including the lever support 61 and the lock-release device 60 that is explained further below and is shown in FIGS. 8A, 8B and 8C.

The shown hybrid DPDT device 51 further includes setting switches 57-1 to 57-n, LED indicator 54, control, communication and power consumption reporting circuits (not shown in 51) but are explained later.

The hybrid DPDT or SPDT switch-relay can be both encapsulated or packaged in a similar enclosure or box 50 that is structured to be attached to a frame for supporting the hybrid device, a decorating cover, a key lever or a push key and be installed into a commonly used electrical wall box such as the known US 4"×2" box or the European round 60 mm wall box, or rectangular boxes in different sizes.

FIGS. 8A, 8B and 8C show a well known lock-release device, also known as mechanical latching device 60. The known lock-release mechanism shown in FIGS. 8A~8C are used for manual push-keys used for selecting a given input or a given function of electronic appliance, or for selecting manually a TV channel of the older days television tuners. The mechanism is embedded within each key bar individually.

Figure 9A:
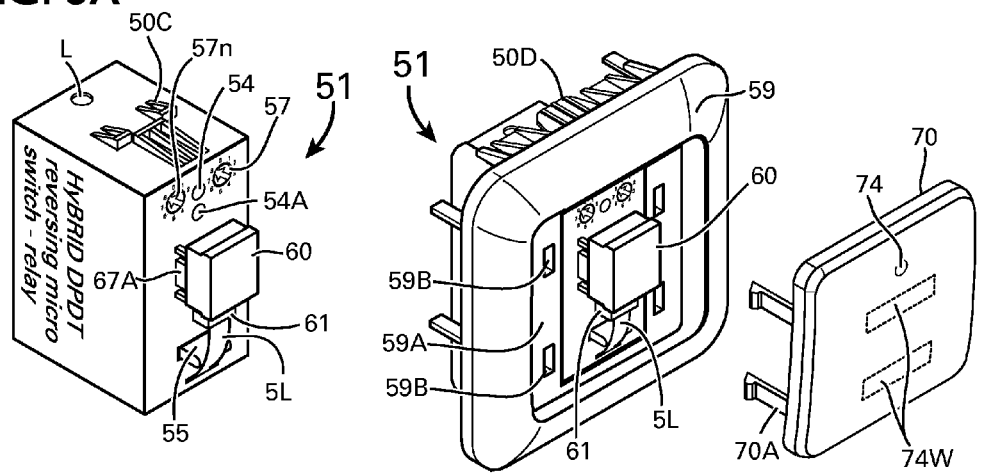
FIGS. 9A~9C are perspective and cut views showing the assembly of the hybrid SPDT or DPDT switch and SPDT relay with a frame support, cover and push keys variations.

FIG. 8C showing the prior art mechanism, introduced to explain the features created by combining the very simple lock-release to a structure 60 shown in FIG. 5D that includes a lever support 61 for actuating the hybrid switch-relay 51 mechanically via a push key 70 of FIG. 9A at ease and with minute force, be it push to lock, push to release and push-push combinations.

FIG. 8A illustrates the portion of the molded lock-release indentations of a bar of a push switch (not shown). The key bar 67 referred to in FIGS. 8A~8C is not part of the switch itself, it is a push rod containing the indentation or groove 69 that form the path for the guide lock link 66 that form together with the indentations the lock release structure One end of the guide lock link is held in position shown as guide center point 66A, with the guide lock link traveling inside the groove or indentation 69A that limits the bar movement between the lock point 69B and release points 69C. The other end of the guide lock link is traveling along the indentation 69 in a counter clockwise movement between the lock point 69C and the release point 69B.

The spring 62 held into place by the spring holder 67B and by the key body 60 provides dual functions, one is a release force onto the key 60 toward the release position, opposite to a finger push to lock the push key into the lock position. The spring 62 other function is to maintain the guide lock link 66 in its indentations 69 and 69A both shown in FIG. 8B when the bar is moving either way and the guide lock link 66 is forced to move to left-right and up-down, through the indentation elevations and ridges, shown as 68A-68D, designed to steer the guide link 66 movement in a counter clockwise rotation through the indentation 69 shown in FIG. 8C.

The guide lock link is limiting the forward-backward movement of the bar 67 to the length of the indentation 69A and into two positions only, the locked position or point 69B and the released position 69C.

The bar 67 movement within the indentation path 69 is a forced move by a finger to lock, and by the spring pressure to release. The counter clockwise movement is created by the blocking ridges 68A and 68B to unlock and 68C and 68D to lock. The ridges prevent any movement in the clockwise direction, with two only stationary points remain, the lock and the release points or positions 69C and 69B respectively.

The two positions mechanism of the prior art recited above, or any other known lock-release mechanism applied to lock or latch a mechanical structure, such as the lever support 61 to engage the plunger 55 can be used. The shown prior art is a preferred low cost mechanism using three moving parts only, the molded key body 60 comprising the key bar 67 and the lever support 61 as one part, the spring 62 as another part and the guide lock link 66 as the third part, such simple mechanism is very reliable.

The elements shown as key guide 60A, bar receptacle 67A, the spring holder 67B, the guide movement range 66B and the guide center point are included in the hybrid switch-relay molded enclosure 50, and are not individual elements or parts. This make the entire mechanism comprising key 60, spring 62 and guide lock link 66 to be the only moving parts for providing the hybrid switch-relay with three key function, push to lock, push to release and push-push that are further explained below.

As shown in FIG. 8B the distance between lock and release is the max. movement 65 distance shown in FIG. 8C. In practice such movement is stretched over 4~5 mm. Such lock-release movement wherein the lever support 61 will be locking and releasing by a stroke movement of 4~5 mm the end of the flexible lever 5L is a perfect stroke movement for operating the SPST or SPDT micro switch 10 of FIGS. 3A~3C and 51 of FIG. 6B.

The referred to above structure or a different lock-release mechanism structure enables to operate hybrid switch combination be it SPDT or DPDT switch with the SPDT relay and provide for two way switching, manual switching via the key 60 or via a decorative key and remote switching by operating the SPDT relay through its coil 6L. It is similarly obviously clear that the hybrid switch-relay combination using toggle or rocker SPDT switch 30 or DPDT switch 40 can be manufactured at low cost and with simplicity and conveniently installed and used.

Figure 7A:
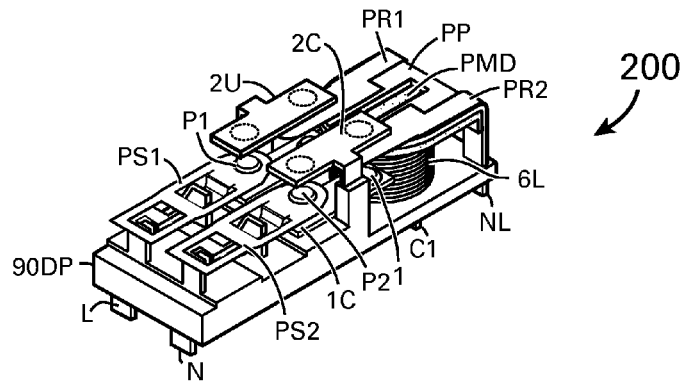
FIGS. 7A~7B are perspective view and electrical circuit diagram of a straight DPDT hybrid switch comprising DPDT micro switch with DPDT relay of the present invention.
Figure 7B:
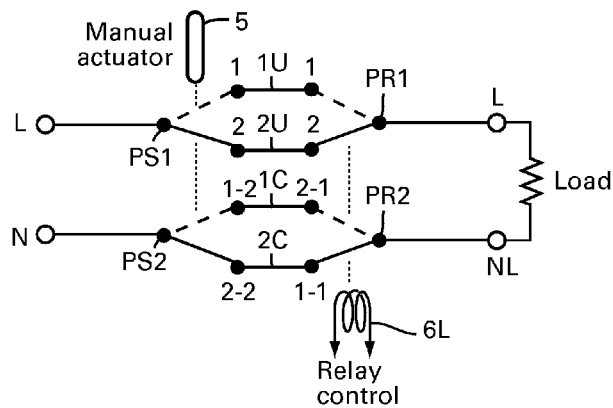
Figure 7C:
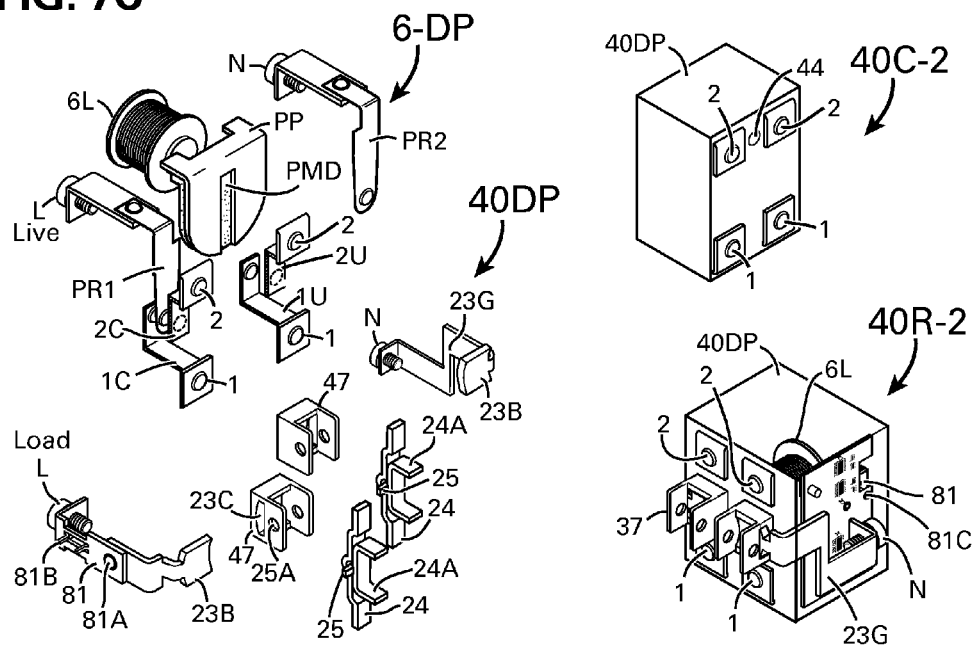
FIG. 7C shows exploded and perspective views of a straight DPDT hybrid switch comprising DPDT rocker switch with DPDT relay of the present invention.

A straight DPDT shown in FIGS. 7A~7C is needed to replace DPST (Dual Poles Single Throw) switches used for wet rooms or zones in building and residences to switch on-off both AC lines, the live AC line and the neutral AC line. It is common or an established rule in some countries that lights, heaters and water boilers in bath rooms or laundry corners must be switched via dual pole switches.

For such straight application the present invention meets the requirement fully and provides the manual and remote actuating of the dual AC lines.

FIG. 7A shows DPDT hybrid switch 200 comprising two poles PS1 and PS2 of a micro switch linked with two poles PR1 and PR2 supported by an insulator structure PP and the armatures PMD and operated by the relay coil 6L integrated into a base 90DP. Also shown are the four contactors 1C, 2C, 1U and 2U. In fact the DPDT hybrid switch 200 comprising two SPDT hybrid switches 20 operated together by a single coil 6L and the actuator 55 of FIG. 6B.

FIG. 7B shows the electrical circuit diagram of the hybrid switch 200 that is an extension of the prior art circuit of FIG. 1A that perfectly fit the need for switching the dual AC lines, the live line and the neutral line via the manual key and remotely.

FIG. 7C shows the toggling or rocker DPDT hybrid switch 40DP which is an extension of the shown reversing hybrid switch 40R of FIG. 6A. 40DP hybrid switch operates and is structured similarly to the hybrid switch 40R with the exception of the dual relay poles PR-1 and PR-2 and the armature PMD that is constructed with insulating body PP to insulate the two poles PR1 and PR2 from each other and from the armature itself.

Other differences are the replacement of the two reversing contactors 1G and 2G with four straight contactors 1C, 2C, 1U and 2U, the change in the terminals from N, L, T1 and T2 into N, L, L (load) and NL (neutral load). The changed elements are shown in the exploded view 40DP and the packaged or casing assembly 40C-2 and 40R-2 of FIG. 7C.

From the above description it should also be obvious that though the reversing DPDT hybrid switch 40R and 51 referred to above are shown to comprise SPDT relay and DPDT switch, the reversing DPDT hybrid switch can integrate a DPDT relay comprising the two relay poles PR1 and PR2 and SPDT switch comprising the single pole 24. To further explain the reversing DPDT hybrid switches can integrate an SPDT switch comprising single pole switches 20 and 30 with DPDT dual relay poles PR1-PR2 such as described and shown in FIGS. 7A and 7C.

The electrical wiring devices, such as AC switches and AC outlets are offered with decorative keys and cover designs including color selection to be accepted or approved by architects and interior designers within the construction industry. The wiring devices manufacturers are therefore making efforts to provide different covers, keys and range of modern colors for the electrical switches, including the use of LEDs to indicate the status of a load operated by a given switch.

It is preferable therefore to provide the hybrid switch-relay assembly in a given enclosure or package that can be adapted to be attached by the different manufacturers covers and keys, or be provided with range of holders, covers and keys that can be fitted by simple attachment to the given hybrid switch-relay enclosure, such as the shown snap-in attachment structures 50C and its counterpart locking structure 50D of FIG. 9A, including the guide receivers 59B of the holder 59A surface for supporting the stop guides 70A of the push key 70.

Figure 10A:
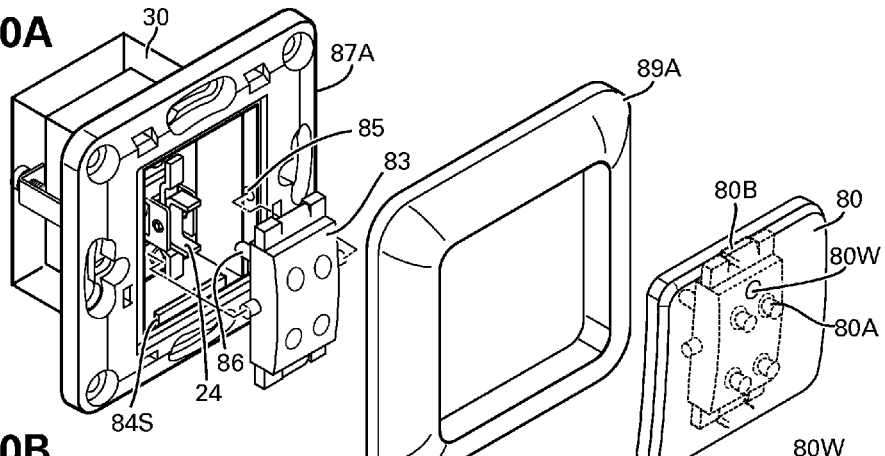
FIGS. 10A~10C are perspective and exploded views showing the assemblies of the hybrid SPDT and DPDT switch and SPDT relay with frame support, cover and push switch variation as used in Europe.
Figure 10B:
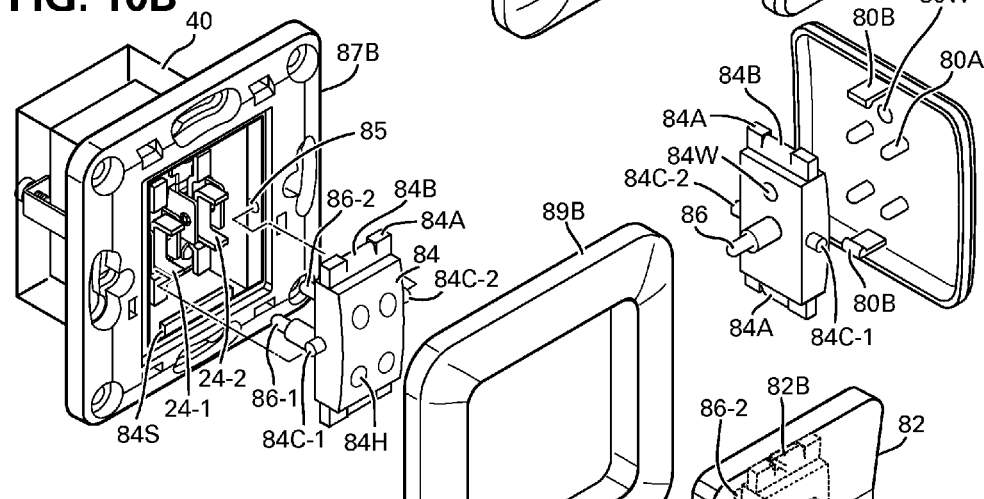

FIG. 9A shows the hybrid SPDT switch-relay 20 and the hybrid DPDT switch-relay 51 using a selected cover 59 shown mounted onto the holding frame comprising the body 59A, the guide receivers 59B and the self-locking structure 50D. FIGS. 10A and 10B show molded frame bodies 87A and 87B including the casing of the hybrid switch-relay 30 or 40 into European device sizes including the covers 89A and 89B.

Figure 11A:
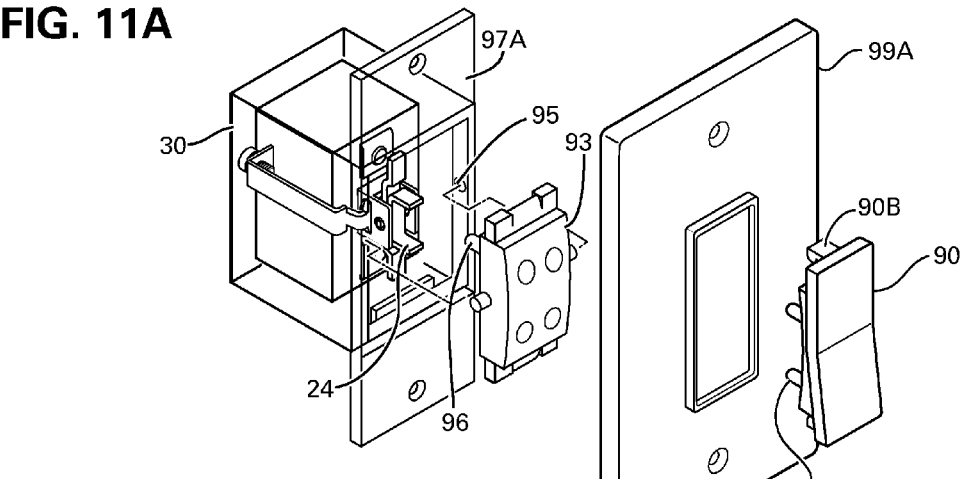
FIGS. 11A~11C are perspective and exploded views showing the assemblies of the hybrid SPDT and DPDT switch and SPDT relay with frame support, cover and push switch variation as used in the USA.
Figure 11B:
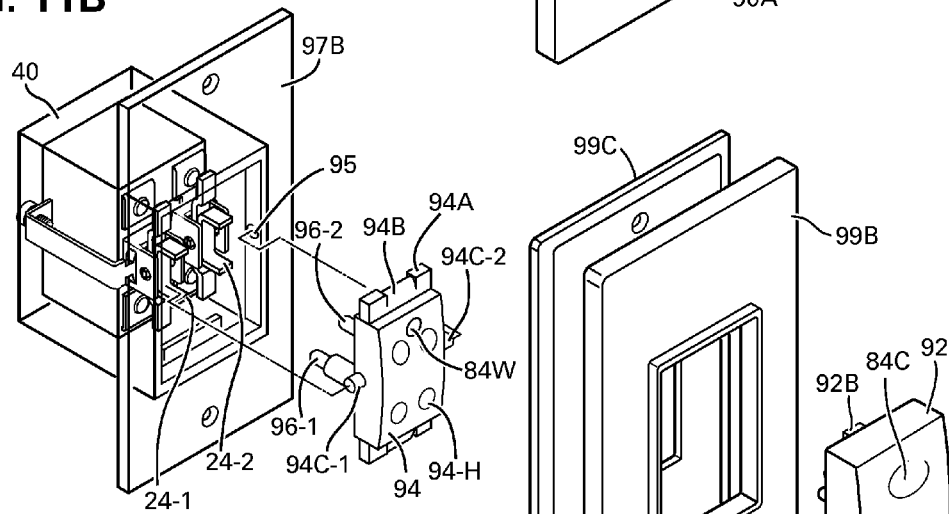

FIGS. 11A and 11B show the covers 99A or 99B and a frame body 97A and 97B structured for mounting the hybrid switch-relay into standard 4"×2" US wall box for use with well known rocker keys 90 or 92. The covers 99A or 99B used extensively in the US with the cover 99A is shown using visible screw heads for attachment. The cover 99B is a known decorative cover with hidden screws used to attach a snap-on base 99C for attaching clean decorative cover 99B without the shown screw head.

Figure 9B:
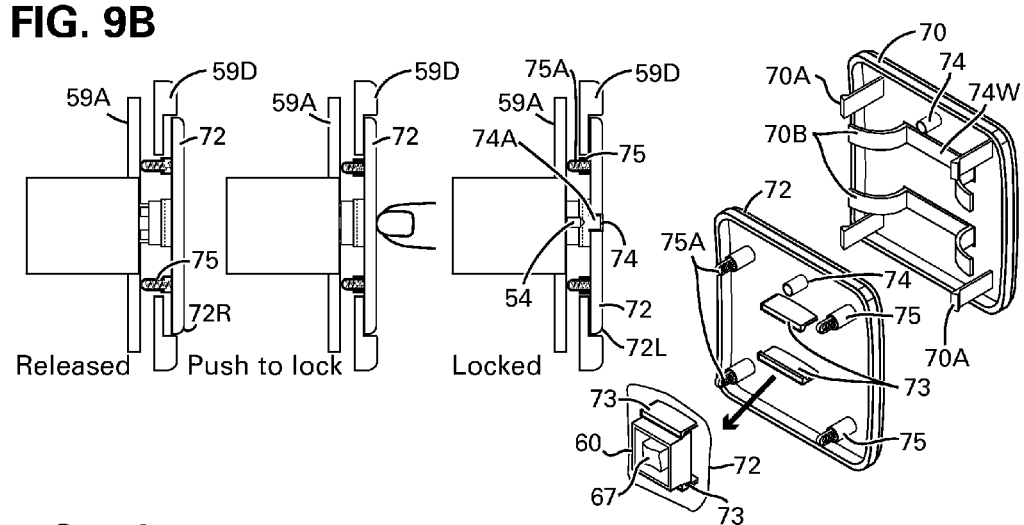
Figure 9C:
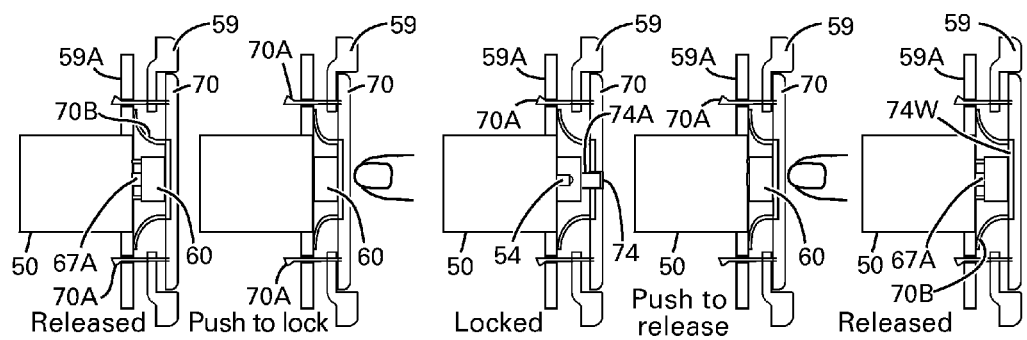

Similarly the hybrid SPDT micro switch-relay and the DPDT micro switch-relay shown in FIGS. 9A, 9B and 9C use a casing 50 with frame 59, 59A and 59D fit for mounting hybrid micro switches SPDT 20 and DPDT 51 into European round or rectangular wall box. The shown keys 70 and 72 are push key, operated by pushing the key inwards, be it for on or off switching action.

The key 72 shown in FIG. 9B is operating in push to lock and push to release modes, wherein the key surface is identifiable as being locked or released. This is achieved by providing the key 72 with self-locking holders 73 that are self-attached onto the key 60 of FIG. 5C and therefore the key is parking along with the stroke movement such as 4~5 mm, referred to as the lock position 72L and release position 72R in FIG. 9B. The key is shown aided by spring-piston structures 75/75A to provide better balance and stability to the key during the finger push action.

The other key 70 shown does not attach to the key 60, the key is supported by the shown four springy structures 70B, or by spring and piston mounted on the inner surface of the key such as 75 and 75A of FIG. 9B. The key 70 further includes four stop guides 70A with the inserted into the guides receivers 59B shown on the holder 59A surface, such that when the key 70 is pushed to lock the key 60 it will be pushed back all the way and parked by the four stop guides.

The key 70 remains therefore in its fixed park position regardless if the hybrid switch is in a locked or in a released position, the key is therefore termed push-push key, because the key remains in parking position, flash with the cover 59D.

The keys 70 or 72 may have matching or different designs and finishing, tint or color, texture and/or are with or without indicator window 74 and/or IR propagating window 74W. IR passing filters are dark gray or literal black tinted transparent plastic materials such as polycarbonate. Molded key 70 or the cover 59 made of such tinted transparent material will enable the propagation of IR signal in air through such key or a cover.

It is also possible for example to mold the springy structures 70B to be made of tinted transparent material for passing IR signals in air such that the springy structure base becomes that IR transparent window 74W shown in FIGS. 9A~9C.

The indicator 54 shown on the front surface of the hybrid switch relay 51 indicates the on-off status of the load including a significant change in its status, such as a "standby" state, wherein the current drained or the power consumed by the load is substantially reduced. The indication color, such as green, red, yellow or blue is projected through the surface indicator thin semitransparent window 74 of the keys 70 and 72.

Same applies to the rocker key that can be designed and structured into many shapes and be attached to the rocker switch onto the rocker key body 33 shown in FIG. 4A or the rocker keys bodies 83, 84, 93 and 94 shown in FIGS. 10A, 10B, 11A and 11B including the details pertaining to the self-lock attachment, such as the pins 80A of the key 80 and 82, and 90A of the keys 90 and 92 that fit into the corresponding receptacle holes 84H and 94H respectively. Also shown are the lock hooks 80B, 82B, 90B and 92B that attach to a lock-on structure 84B and 94B of the key body respectively.

Each of the shown key bodies 80 and 90 includes a single piston 86 and 96 respectively for toggling the single rocker pole 24 of the SPDT switch, while each of the key bodies 82 and 92 includes dual pistons 86-1 and 86-2 or 96-1 and 96-2 for toggling the dual rocker poles 24 of the DPDT switches by engaging the stop bar 84A of the key body 84 or 94 with the stop bar 84S of the hybrid switch cases 30 or 40.

Figure 10C:
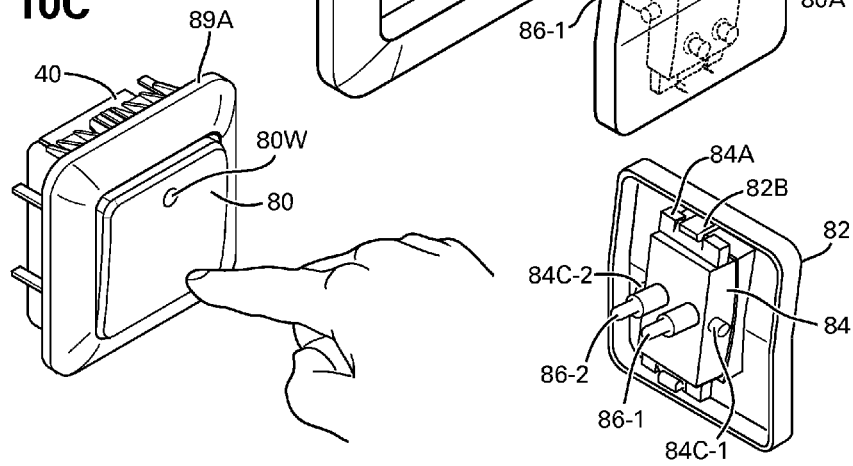

FIGS. 10A~10C show also the transparent window 84W in the key body 84 and the indicator thin semitransparent window 80W that are in-line with the indicator 44 shown in 40-C of FIG. 6A.

Figure 11C:
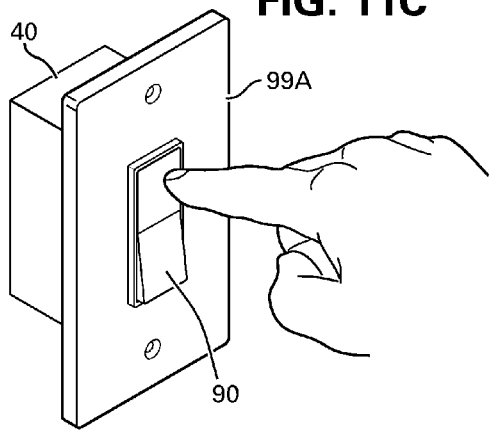

Each of the key bodies shown in the exploded views 10A, 10B, 11A and 11B further comprising the referred to above lock-on structure 84B and 92B for supporting the key lock hooks 80B, 82B, 90B and 92B and dual pivots or short shafts 84C1/2 and 94C1/2 that are affixed into the center rotation sockets 85 and 95 respectively of the molded casing 30 and 40. FIGS. 10C and 11C show the assembled rocker switches operated by a finger push of the keys 80 or 90 respectively.

The cover for the rocker switch 30 or 40 can be the same cover design, shape and size as the cover 59 shown in FIG. 9A for the push switch or any other decorative shape. The covers 59, 89 or can be designed and provided for installing a plurality of hybrid switches mounted in a wall box containing more than one switch or hybrid switch and/or combination of hybrid switches and other switches. The cover preferably should be designed and provided for covering plurality of hybrid and common switches including power outlets mounted into the same wall box.

FIG. 12A shows a block diagram of the on-off switching circuits for operating AC appliances such as light fixtures or heaters, manually through the SPDT switch comprising pole PS and two contacts 1 and 2 and remotely via SPDT relay comprising coil 6L, pole PR, and two contacts 1 and 2 of the hybrid switch-relay 10, 20 or 30 of FIGS. 3B, 3C and 4B.

The combining of the SPDT or DPDT switch and the SPDT relay of FIGS. 12A and 12B via two traveler contacts shown is for providing two independent on-off switching of an AC appliance, remotely via the relay coil 6L and manually via manual switch key 70 or such as the key 80 of FIGS. 9A and 10A.

The remote switching of the hybrid switches 20, 30, 40 or 51 however presents a reliability issue, wherein for error free remote switching of an appliance it is necessary to know the appliance operating status. It is necessary to know if the appliance power is on or off before commanding the relay to switch over. Without appliance status, the reversing of an SPDT or DPDT relay may switch the appliance power opposite of the intended command.

For example, not knowing that a heater or a light is switched off, commanding the relay to switch off may switch the heater or the light on. For such basic reason it is not possible to rely on a relay coil status versus an unknown SPDT or DPDT manual switches positions that are operated manually at random.

Further, for an SPDT relay control to become truly reliable it is necessary to feed a returned confirmation or data pertaining to the current drain or the on-off status of the light or the AC appliance, propagated from the light or the appliance to the controller. This mandate a two way or bidirectional communications, control commands to the hybrid-switch relays or the appliance itself and a returned confirmations, status, current drain data or power consumption data from the appliances or the hybrid switch-relay to the controller.

The need for communicating real time current drain or power consumption data to power stations and power distributors are the core topic and the main objectives for the home automation considerations and the debates around the world held presently on the subject of signal or data connectivity and the smart grid programs.

The referenced US patents and the shown circuit diagrams of FIGS. 12A and 12B disclose bidirectional bus line via twisted pair 132, IR via the IR transmitter and receiver 109A/109B and RF via the antenna 106 (in air), and optical communications via two optical transceivers 104 through lightguide or fiber optic cable 130 for remotely operating appliances including the receiving of a returned data through the drivers 107, 109, 105, 103-1 and 103-2 respectively.

Even though wireless IR and RF communications are perceived to be simple, they are not very reliable, for example, movements or placement of obstructing objects within a room may obstruct the line of sight of an IR remote on-off command to a given appliances, including a command from an IR remote control repeater disclosed in the referenced patents and applications. The appliance returned confirmation and/or the on or off command itself may become obstructed and unreliable.

RF may transmit and receive erroneously by invading to and from other residences and/or the RF signals do not necessarily cover the whole residences and commands or returned data are not communicated or do not reach their destinations as intended. RF network for covering many appliances and AC outlets of a residence require extensive, complex and accurate addressing that are far beyond the electrical installers training and knowhow.

The other basic reliability issue stated above is the unknown state of the SPDT PS1 or DPDT PS1/PS2 poles shown in FIGS. 12A and 12B making the on or off state of the hybrid switch and/or the cascading SPDT or DPDT switches unclear. Hence, the inability to have an accurate on-off state of the manual SPDT or the DPDT switch presents a system reliability problem. As will be explained later the CPU 101 that controls the communications and the state of the coils 6L to 6L-n and is fed with current drain signals is able to identify the traveler connections with the load based on the current drain or on-off status detection. Moreover for a plurality of n hybrid switches packaged together the CPU can be fed with combinations of current drained signals and status detector signals.

The introduction of the current sensor 100 and the status sensor 100A are the solutions for providing a reliable on-off status of the electrical switches to a dedicated controller, to a video interphone or to a shopping terminal controlling the AC devices that are disclosed in the referenced US patents and applications.

The current sensor 100, be it current sensor by induction, magnetic hall sensing circuit, low ohmic resistor or metal alloy, or any of other known current sensing circuits and methods, identifies in real time the appliance status for propagating data pertaining the status of the appliance via POF 130, IR in line of sight, RF in air or electrical signals via bus line or network. The use of twisted pair in a bus line 132 is also possible when the hybrid switch is constructed with separation or partitioning for installation inside electrical cabinet, or into a partitioned wall box dividing the low voltage connectors from the AC power wiring and connectors.

A real time current drain data identifies the load status, enabling the controller to positively without error switch on and off the light or the other appliance. Moreover it provides the base for the residences, offices or other businesses or organizations to report their real time current drain or power consumption to a power smart grid of a power provider, or power station.

The DC power for the relay coil 6L, the CPU 101 and other internal circuits can be supplied from a small power supply IC circuit using known switching power supply circuit for outputting the low DC voltage and current needed and/or using DC analog voltage regulators, or other small current power supply circuit such as referred to in the U.S. Pat. No. 8,444,124. Even though the relay coil power consumption is a fraction of 1 W it is advantageous to use latching magnetic poles PR and armatures PM with the coil 6L because latching relays are actuated by a short pulse and therefore save power consumption and reduce the DC current drain from the internal power supply.

Common light switches do not connect to AC neutral line and use only live AC and load lines, with only two wires are commonly found in the conduits and in the light switch wall boxes.

On the other hand, the existing rules, codes and regulations of all known electrical wiring permit unrestricted introduction of AC neutral line into the conduit and electrical wall boxes, including the connections of such AC neutral line to any and all AC switching and other AC devices and circuits, such as the hybrid switch-relay of the present invention.

From the above description it becomes clear that the SPDT hybrid switch-relay devices of the present invention can be installed into a standard electrical AC boxes, wired in compliance with the electrical codes and rules, without any significant changes to the basic wiring of the commonly installed electrical systems at low cost and simplicity, needing the addition of neutral wire and one of optical cable, IR or RF in air for bidirectional communications.

The referenced US patents disclose the direct attaching of optical cables to optical accesses. The POF cables ends are terminated by a sharp guillotine cutter for enabling the cut surface to be direct attachment to the optical transceiver 103 via the accesses 104, disclosed as one way or unidirectional and two way or bidirectional and combinations thereof, for controlling via optical signals propagated through cascaded chain of the optical cables 130, and by IR adjusted to be in line of sight and/or by wireless RF signals and/or by electrical signals via a bus line 132.

From the teaching of the referenced US patents it also become clear that the AC devices such as current sensors or AC switching devices or AC outlets can be set with address pertaining the particulars of the appliance including the room or zone of the premises where the appliance or the load is located.

The setting is processed via setting selectors 108-1~108-n such as shown in FIGS. 12A and 12B and/or via downloading such particulars and address into a memory included in the CPU 101. This includes the downloading via RF signals, IR in air signals, via optical signal through the optical cable and via hand held device into the one or more lightguide accesses termed optoports, of the AC device, or directly via a loading connector or terminals.

Another feature by the hybrid switch-relay of the present invention is in the programming of the CPU 101 and the method to assign "double keying" or "triple keying" to the key 70, 80 or 90 of the hybrid switches or "double action" to the levers of the switches such as "on-off-on" or "off-on-off". The assignment is applicable to any of the hybrid switches individually installed or connected by traveler wires with SPDT and/or DPDT switches, for switching on-off a group or all of the lights or a group of other appliances in the premises as explained further below.

Figure 12C:
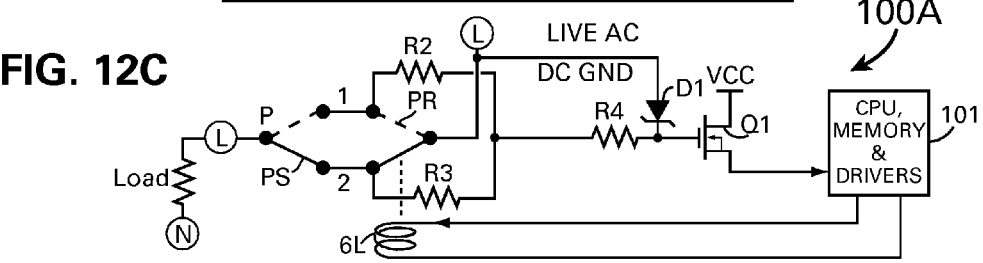
FIG. 12C is a block diagram and circuit of the status sensor of the preferred embodying as used in the hybrid switch.

FIGS. 12A and 12B show the current sensor 100 and FIG. 12C shows the status sensor 100A. The status sensor 100A shown is not needed for operating the hybrid devices of FIGS. 12A and 12B because the current sensor 100, connected in series with the load, through the pole PR will positively identify the current drain through the load and therefore provide error free status.

The status sensor 100A in contrast to the current sensor 100 does not provide current drain values or data, it does provide however a status data by identifying the traveler line status versus the SPDT and/or DPDT switch position and outputting a signal when the live AC power is disconnected from the load. In simple terms the status sensor outputs a signal when the load is connected to one of the T1 or T2 travelers line and the live AC is fed to the other traveler line.

FIG. 12C shows an electrical circuit or a block diagram of a conceptual circuit of the status sensor 100A of the other preferred embodiment of the present invention, wherein the two shown sensing resistors R2 and R3 both having high ohm value are connected to the two terminals 1 and 2 of the SPDT relay. R2 and R3 are connected together at their other end via a series resistor R4 to the FET Q1 gate and via a zener diode D1 to the ground. For clarification, the ground potential and the DC polarity fed by the power supply 102 for powering the CPU, the relays and the other circuits of the hybrid devices 20, 30, 40, 51 or 200 is connected to the live AC. The ground DC potential and the positive DC or VCC is for example +12V or +5V or +nV measured versus the AC live line.

The AC live line is connected directly to the pole terminal PR and therefore when the pole PR and PS are engaged with contact 2 as shown in FIG. 12C, the load and the live line are connected and the sensor resistor R3 is at a DC ground potential and the FET Q1 gate signal is zero, keeping the FET Q1 in off state. When the pole PR is switched over to engage contact 1 the load will be connected via R3 and R2 to the live line L, and the load that is fixedly connected to the neutral line N will connect the neutral line serially with the live AC via the sensor resistors R2 and R3 instead.

The resultant voltage divider R2 and R3 (the resistance of the load is negligible) provide a minute current through R4 and the zener D1 to ground, presenting an adequate voltage potential to the FET gate to switch the FET Q1 on, with the gate source pole feeding high state signal to an I/O port of the CPU 101, identifying the load to be switched off.

The memory of the CPU 101 stores both the status that are needed for the CPU to operate the relay without error, such that the individual contact T1 or T2 terminal, commensurate with the on-commands or off-commands by the keys 70, 80 or 90, or by a command received from the automation controller 250 shown in FIG. 13A via optoports, IR, RF or bus line, including commands via a PC network through the Internet, or as will be explained below, by repeated keying such as double or triple keying including keying by SPDT or SPDT switches (not shown) connected in a cascaded chain to the DPDT hybrid switch relay as programmed.

The referenced U.S. Pat. No. 8,269,376 teaches a method and apparatus for switching on-off loads, such as lights or other appliances individually, a group of loads and all of the loads or given appliances by switching "on-off-on" or "off-on-off" via the hybrid switch and/or via an SPDT or DPDT mechanical switches connected in a cascaded chain to the hybrid switch.

Figure 13A:
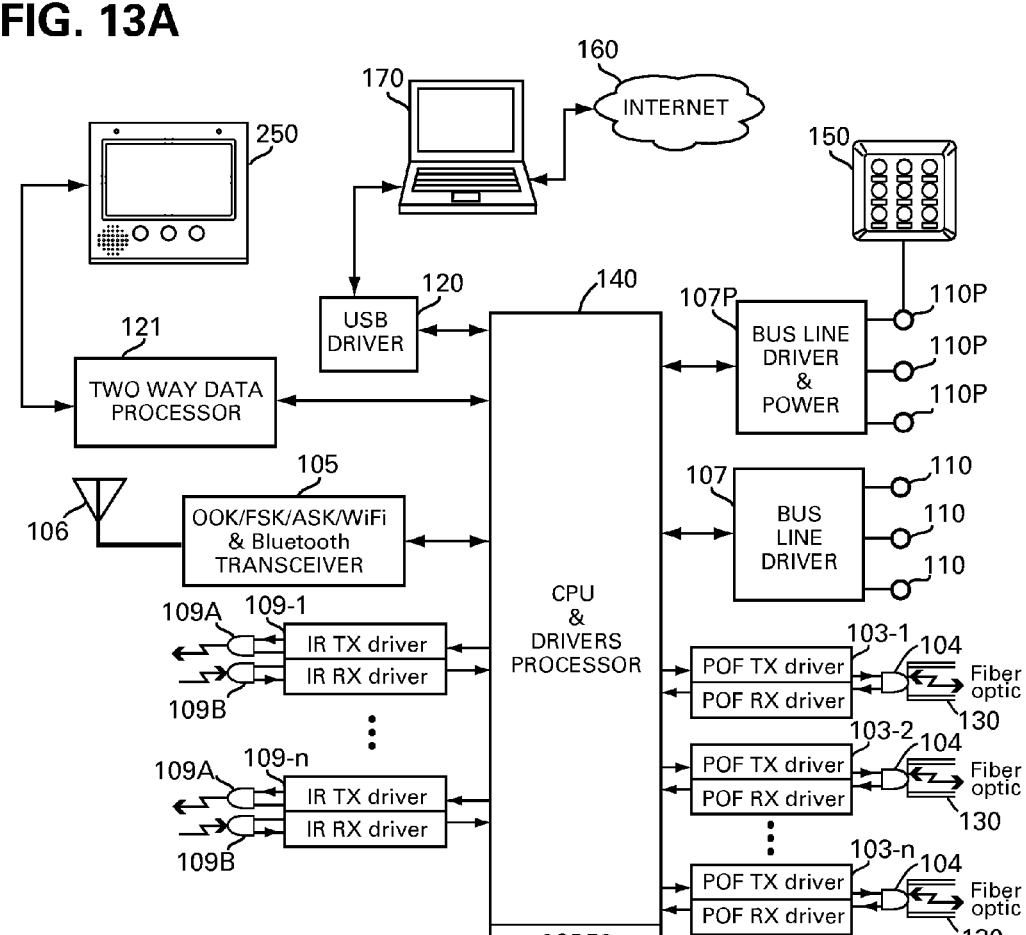
FIG. 13A is a block diagram showing the home automation grid and network for operating remotely the hybrid switch and associated devices of the present invention.
Figure 13B:
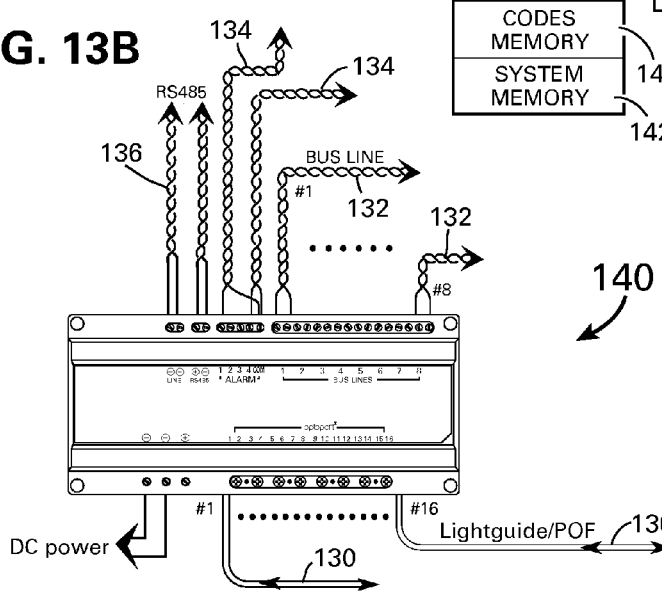
FIG. 13B is an illustrative connections provided by an home automation distributor for propagating commands and responses within the home automation grid and network.

The hybrid switch is commanding the on or off to the individual, group or all of the given loads, be it lights or other appliances directly via a cascading optical fiber cable or RF and via a controller 250 of the home automation, comprising dedicated controller, video interphone monitor or shopping terminal, including keypads 150 or touch pads or touch screen and/or via an home automation distributor 140 shown in FIGS. 13A and 13B.

Each of the shown hybrid switches 20, 30, 40 and 51 in FIGS. 12A and 12B and the hybrid switch 200 (not shown) may include the many circuits such as cascading transceiver 103 and optoports 104 for the POF 130, IR and RF transceivers 109 and 105, the bus line driver 107, the current sensor 100, the status sensor 100A, the setting selectors 108-1~108-n.

It is clear that not all the circuits are needed, for example, when no cascading lightguides or POF are used only a single optoport 104 is needed, and when only IR or RF commands are used, no optoports are used and only IR 109 or RF 105 transceivers are included in the hybrid switch-relay.

Similar to the teaching by the referenced patents and applications the settings for the hybrid switch-relay including the room or the zone where the hybrid switch and/or the load is installed or operated, the appliance identifications and other operation details can be set via a setting selectors 108-1~108-n or via optical downloading through the optoports 104, IR downloading via the IR transceiver 109 or RF downloading via the RF transceiver 105. The downloading and setting include the programs for switching on-off a group of lights or appliances and all the lights and the given appliances as explained later.

Accordingly, the inclusion of setting selectors 108-1~108-n and the status sensor 100A or the current sensor 100 into the circuits of the different hybrid switches 20, 30, 40, 51 and 200 can vary with the intended purposes, and not all the circuits shown are needed or included.

For a stand-alone SPDT hybrid switch or for a single reversing DPDT hybrid switch connected to a cascading DPDT and SPDT manual switches installed in the premises, there is absolutely no need for particulars and address setting and for a system controller all together.

On the contrary such setup of a single hybrid switch of a residence can be operated via a very low cost on-off remote controller (not shown) for propagating on-off commands, for example, via the AC live line and actuating the armature PM of a controllable coil 6L via AC control signal known as X10, or via a simple short driving pulse to the coil when the armature is magnetic latching type.

For such simple operation the coil 6L can be driven by a driving pulse and actuate said magnetic armature to reverse its latching position, thereby reverse the load status from on to off or from off to on. No other control circuit is needed or used.

The hybrid switch can be installed into electrical cabinets and the coil 6L can be connected to low voltage or AC power for actuating the armature PM with the remotely actuated poles PR, for such remote actuation no further circuits are needed or used.

The question of the use of the current sensor 100 versus the status sensor 100A or both involves the specific requirement and/or the need to report current drained and/or the consumed power as measured and calculated. The use of current sensor 100 or status sensor 100A or both is not a technical question only, it involves commercial and/or a future regulatory compliance such as mandating the reporting in real time power consumption.

It is possible, for example, to use the status sensor 100A instead of the current sensor 100 to report power consumption in real time. This is achieved by enabling the user to install into the memory of the CPU 101 the specified power consumption of the load. This enables to report power consumption as recorded and stored in the memory and not necessarily as measured.

The preferred solution is the use of the current sensor 101 for providing power consumption or current drained values even though the status sensor is well suited for the control of individual load, group of loads and all the loads such as light or air conditioning of the residence.

The commands for switching on-off and similar commands and the command responses including status and power consumption report within the residence need not be at fast rate. On the contrary, slow rate such as 500 baud are common and are the standard for IR command in air, in line of sight.

It is wrong to apply different rate for optical signaling via the POF and this low rate is the preferred rate for both optical signals, the IR in air and visual light via POF. The slow rate does not involve signaling speed capability only, the power switching time via the poles of the relays and the mechanical switches is measured in mili seconds, which timing fit the slow rate of 500 baud and there is little or no merit to provide control commands and responses at higher speed, particularly when the responding element and circuits are not ready for reply. Moreover, power consumption calculation is slow, this is referred to later.

As referred to above the hybrid switch-relay can be operated to switch on and off a group of lights or all the lights, or other group of appliances and all of the other group of appliances in the residence. This mandates the propagation of commands through the residence automation grid or network shown in FIG. 13A and the automation signal distributor shown in FIG. 13B.

From the above explanation it is clear that different combinations of circuits and programs can be used and applied for providing many variations to the operating modes.

The hybrid switch-relay of the present invention are programmed to generate and propagate commands for switching on-off a group or cluster of lights or a group or cluster of other given loads including all of the lights or of the other group or cluster of given loads of the premises via the hybrid switch keys 70, 80, 82, 90 or 92 and via any one or the plurality of manual switch levers of the SPDT switch and/or the DPDT switches that are connected in a cascaded chain to the DPDT hybrid switch-relay of the present invention.

The term "cluster" in the descriptions and the claims refers to any group of lights or other "given" appliances or loads, the term "given loads" refers to any type of appliances such as heaters, air conditioners, fans, lights, or curtains and blinds and similar.

The command to switch on or off a group or all of the lights of the residence can be propagated from the hybrid switch using any of the bidirectional signals selected from optical signal via lightguides (POF), IR signal in air direct or via IR repeaters in line of sight, RF in air, electrical signal via bus line and via bus line with power feed and any combinations thereof.

The referenced U.S. Pat. No. 8,269,376 discloses standard AC SPDT or DPDT switches as manufactured by different well known brands, it also shows the mounting methods of the combined AC switching device and the AC manual SPDT switches into the wall boxes connected by the travelers wires T1 and T2 in a cascaded chain.

The disclosed process for switching a group of lights and all lights is the repeated keying or otherwise reversely actuating the mechanical SPDT or DPDT switches, be it push, depress, rocker, click, toggle, slide, rotate or any other actuating action to reverse the switch status, all of which applies to the hybrid switch-relay and to the associated SPDT and/or DPDT switches of the present invention.

Figure 14A:
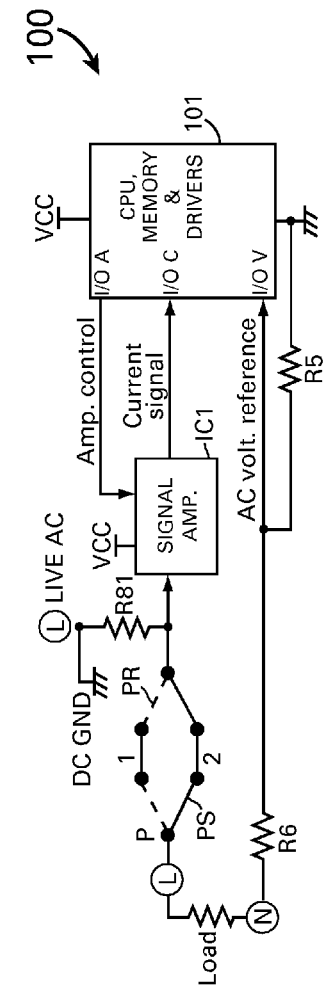
FIG. 14A is a block diagram of the current sensing circuit of the preferred embodiment of the present invention.

The CPU 101 is programmed to time a change in the switch status via the status sensor 100A or via a change in the current drain level as detected by the current sensor 100 fed to the I/O C port of the CPU 101 of FIG. 14A. For example, when the status is "off state" and the hybrid switch key is actuated to switch the light on, the change in the status or the current drain initiates a timing program by the CPU 101. The timing program or a timer activated for a duration of, for example one second or 500 mSec, which is a "waiting duration" for repeat keying.

If within the one second or the 500 mSec. duration the keying is repeated, which in fact reverses the status again, however the programmed CPU 101 operates the coil 6L to instantly re-reverse the pole PR status to maintain the first reverse status (the light on state of the example) and simultaneously feeds a command to the home automation grid or network to switch on the given group of lights as programmed via the system controller or directly via the setting keys or the memory of the given hybrid switch-relay.

When the hybrid switch comprising a plurality of integrated switches and the group of lights or all the lights are all or partially connected to the same integrated plurality of hybrid switches the CPU will operate directly those lights or other loads that are directly connected to it and propagates a command to the other group or all of lights or loads via the automation grid.

The same applies to a reversed processing wherein the first switch actuating is to switch off the light, the next actuation within 1 sec. or 500 mSec. is to reverse the status, the CPU will operate the relay coils 6L to 6L-n to maintain the off state and feed a command to switch off a group of lights of the other lights as set.

When the second actuating is detected, the timer or the timing program by the CPU 101 is reset to restart the timer for another 1 sec. (as an example) and if within the extended 1 sec. a fresh actuating or reversing of the state occur, the relay coil is commanded to maintain the prior state and feed a command through the automation grid or network to switch all lights on or off as the case may be.

When no actuating occurs or is detected during any of the (1 sec. example) timer programs, be it the first timing or the extended timing, the timing or timer program is reset and the switch operation returns to its basic operating modes, reverse the traveler, i.e., switch on-off.

As both the current sensor 100 and status sensor 100A are sensing the load status, a change in any of the cascading switches connected to the hybrid-switch via the traveler lines, be it SPDT and/or DPDT mechanical switches initiates the timer program. Actuating any of one of the switches will reverse the traveler lines and the load status, thereby initiating the repeat keying timer program of the CPU 101.

This makes it clear that switching on-off a group or all of the lights or appliances is operated by each individual standard mechanical SPDT or DPDT switch connected in the cascaded chain with the hybrid switch.

The hybrid switch indicator is programmed to illuminate in a given color to indicate the timer status and the on-off state of the load, the group of loads and all the loads as programmed.

FIG. 14A is a block diagram for feeding current drain signal to an I/O port of the CPU 101. The live AC line is shown connected to the circuit ground, which is explained above to be the negative pole of the VCC.

The signal amplifier IC1 is a well known linear amplifier or dual amplifiers IC, connected in series for amplifying the current drain signal fed from the current drain resistor R81 referred to above as the structure 81. The amplifier IC1, combining two amplifiers also known as operational amp. or op. amp, with each amp is set to amplify by, for example, up to a factor of 100 and the two in the series can therefore provide up to 10,000 amplification factor. The linear amplifying of the signals generated by the 1~500 mA and 100 mA to 20 A drain will be well within the linear range of the amplifier IC1.

The CPU 101 including an analog/digital processor and analog to digital and digital to analog converter ports, digital ports and analog ports. The CPU 101 is a commonly available CPU, such as 8 bit or 16 bit and low power consuming processor including a memory at low cost.

The amplified current signal is fed from the amplifier IC1 to the port I/O C and based on the amplification control status and the data pertaining to the converted analog current signal to digital, the CPU, is programmed to adjust via the I/O A port the amplification factor of the amplifier IC1 to obtain the optimum amplification as programmed, commensurate with the received signal to be in mid or most linear range of the sensor specified range.

Figure 14B:
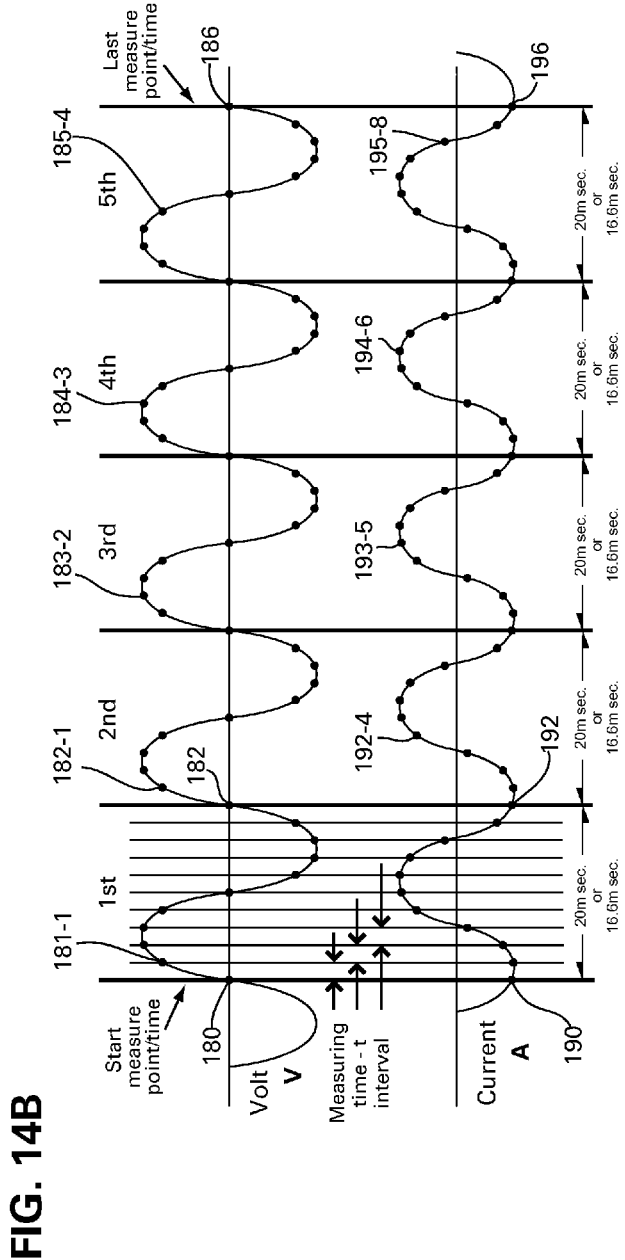
FIG. 14B shows sinusoidal curves of the power line voltage versus the current and their phase shift with measuring time divisions over five sinusoidal periods.

The load, for example a fluorescent light or a motor of a washing machine is not a pure ohmic or a resistance load. Non ohmic loads cause a shift in phase between the voltage curve and the current curve and/or distort the curve by high power digital switching power and loads. FIG. 14B shows two sinusoidal curves, the voltage curve 180~186 and the current curve 190~196, which are shifted by a random angle, caused by a load comprising coils and capacitors.

The voltage curve 190~196 is a curve of a reference voltage fed to the I/OV of the CPU from the neutral AC terminal N via a large ohmic divider R6 and R5, with R6 value is in a range such as 0.5~1.0 Mohm and R5 value is few Kohm, to provide an optimum reference signal level representing the power line voltage, such as the 120V/60 Hz of the US or the 230V/50 Hz of the European power line. The current curve 190~196 is the amplified current signal and an accurate reference of the current drain value.

A zero crossing 180 of the reference voltage curve is the start position or point in time for the processing of the power consumption reading. The current phase shift is evident from the deviation of the zero crossing of the current curve.

The zero crossing 180 shown is the crossing point from negative to positive, at that same time, the start position time 190 of the current curve is shown to be close to the peak of the negative curve, or at a phase shift of more than 90°.

The processing shown in FIG. 14B is the measuring of the five reference cycles 181~185 and the phase shifted five current cycles 191~195. The measuring positions or points in time are shown in FIG. 13B as ten points spread over the voltage curve as 181-1, 182-1, 183-2, 184-3 and 185-4 for the voltage points of time, with the exact point of times over the current curve shown as 192-4, 193-5, 194-6 and 195-8.

The end of processing positions or point of times are shown as 186 and 196. The shown time interval is 20 mSec for 50 Hz and 16.6 mSec for 60 Hz. The vertical lines divide one cycle into ten points of time, therefore the interval between each point of time is the time duration of one cycle divided by 10.

The time interval or the number of measure points during one cycle (Hz) directly relates to the accuracy of the measurement, same applies to the number of measured AC cycles in one measuring round. Both are a decision to be made, in which higher accuracy require more measured AC cycles (Hz) in one measuring round and a decrease in time intervals or an increase in the number of measuring point.

The power consumption is the product of a calculated sinusoidal V×A graphs created on the basis of the measured values at each point of time simultaneously and summed up per each cycle on the basis of the voltage referenced timing. The shown five cycles 181~185 in FIG. 13B are an example of one round of measurement repeated, for example, every two seconds. When a calculation round is programmed to be carried every two seconds the total of five measured cycles will be multiplied by a factor of 20 for 50 Hz and 24 for 60 Hz (50:5/sec.×2 sec.) or (60:5/sec.×2 sec.). This will represent the power consumed in two seconds.

By the above it should be obvious that the power consumption calculation by the current sensors of the present invention can be simplified and performed by a low cost Central Processing Unit (CPU) or an analog/digital processor both are available from many IC manufacturers. It should be also obvious that the current sensor of the present invention can be made small in size, fit into the AC hybrid switch-relay and other electrical wiring devices and provide accurate, practical and low cost solution to the power consumption reporting.

The calculated power consumed values are stored and updated in the memory included in the CPU for reporting as programmed to the system controller. The calculated power consumption value is converted into a predefined programmed protocol that includes particulars of the load or appliance and the location of the load and/or of the hybrid switch. The stored and updated data in the memory are the coded protocols.

The referenced U.S. Pat. No. 8,170,722 discloses the coding of power consumption protocols and the signal structure of the protocol reporting. The command structure is designed to be short command comprising five bytes only that include all the necessary data for reporting power consumption, the load particulars and its location.

As stated above the processing of the power consumption is a slow measuring/reading process extended over five cycles, which time duration is 100 mSec. or 0.1 sec. for 50 Hz and 83 mSec. for 60 Hz. There is no merit to use high speed network within the premises or the residence for power consumption reporting.

From all the above it should be obvious that an SPDT or DPDT hybrid switch-relay can be made to a size and a shape fit for installation into a standard wall box and be connected by two only Live AC and Load wire to the load, plus a Neutral wire to provide power for the circuit.

It is further obvious that the hybrid switch can be operated by push, toggle or rocker keys or any other known switch keys, and that the hybrid can switch on-off an individual load, a group of loads and all the loads as programmed, by multi keying or repeat keying of the hybrid switch key or the key of a switch or switches that are connected to the hybrid switch-relay in a cascaded chain of traveler wires.

FIGS. 15A and 15B illustrate a plurality of hybrid switches structured onto a single base 50Bn and packaged into a single enclosure 40n and 50n. Each of the combined integrated switches-relays are identical with the single integrated switches 20, 30, 40 or 51, with the exception that a single live AC line terminal L can be wired for powering all the plurality of loads, which is advantageous as it cut wiring connections and labor.

Each of the integrated switches can be assigned different load or all be assigned to the same type, such as lights. The assigning and setting of the particulars and the location of each load is the same as referred to above via the setting switches and/or via installing or loading such data into said memory.

The CPU 101 shown in FIGS. 12A and 12B can operate each coil 6L to 6L-n individually, a group of said coils, all the coils and combinations thereof. The indicators 54-1 to 54-n are driven individually via said CPU, but all or a group of indicators are driven in accordance with the status of each load of the plurality of loads connected to each pole terminal individually. This ability to have a single encapsulated switch operating plurality of loads with minimal controlling parts, and minimal wiring connecting terminals is yet another clear advantage of the present invention.

FIG. 15A illustrates n switch-relay structures molded into a common base 50Bn, with all the other elements are referred to above in connection with a single hybrid switch. The shown n hybrid switches enclosure 50n can be directly connected to n load terminals. The shown enclosure 500-1 is comprising 2 plug in pins for AC live 501-1 and neutral (not shown), including n pins 505-1~505-n for n loads. The shown enclosure assembly 500-1 is a plug-in type with no wiring terminals, the socket for the plug-in structure 504 contain 2 pin sockets 503-1 for the live AC and 503-2 for the neutral, n pin sockets 502-1~502-n for the load pins 503-1~503-n. The structure 504 also includes the controlling circuit, shown in FIGS. 6B, 12A and 12B (not shown in FIG. 15A), such that the whole 500-1 enclosure assembly can be plugged in into the socket, with the wiring all completed at the rear side of the socket via the shown AC live, neutral and the n load terminals. The frame cover 50Dn is similar to the frame cover 50D of FIG. 9A provided for n hybrid switches assembly 500-1.

FIG. 15B illustrates n rocker switches enclosed in a structure 40n that is same as the structure 30 or 40 but enlarged to provide for n switches-relays integration.

The switch assembly 40n is installed onto the frame cover 87D that is similar to the frame 87B providing for mounting the assembly enclosure 40n. The keys 84D are sized to fit the n hybrid switches, same as the frame cover 89D and the key cover 82D, they are all adjusted to fit the sizes of the plurality or multi hybrid switches of the present invention.

It also important to note that the structures 81 of FIG. 4B can each be used for each of the plurality of hybrid switches, and/or a common structure 81 can be used for all the individual hybrid switches, and that a common structure 81 and plurality of status sensors can be combined for detecting the status of each and every connected n loads and the individual current is calculated and memorized in said memory.

It should also be obvious that the hybrid switch can detect and report the load status, the current drained by the load and/or the power consumed by the load and communicate at least one way of bidirectional optical signals via POF (plastic optical fiber), IR signal in air, RF signals in air and electrical signal via bus line, or bus line with power feed.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the scope of the invention.

What is claimed is:

1. A method for switching on-off at least one electric load via at least one hybrid switch combining at least one manually actuated switch pole linked to at least one armature actuated pole via at least two contactors, said hybrid switch is selected from a group comprising SPDT including two contactors each with dual contacts, DPDT including four contactors each with dual contacts and reversing DPDT including two contactors each with triple reversing contacts; said hybrid switch further comprising a manual actuating key, a coil with one of magnetic latching and non-latching armature and terminals selected from a group comprising at least one coil terminal for connection to a coil driver, at least one power terminal for connection to electric power feed, single SPDT load terminal for direct connection to a load, two DPDT load terminals for direct connection to a load, and two reversing pole terminals for connection to a load via at least one of an SPDT and DPDT manual switch, said method comprising the steps of:
    a. connecting a load to said single pole terminal;
    b. connecting power to said at least one power terminal;
    c. installing said hybrid switch into one of an electrical wall box and a cabinet; and
    d. switching said load on-off by one of said manual actuating key and driving power to said coil.

2. The method according to claim 1, wherein said SPDT comprising AC live and neutral terminals for connection to AC power and one pole terminal for direct connection to said load via switched live AC line, said DPDT comprising AC live and neutral terminals for connection to AC power and two pole terminals for direct connection to said load via switched AC and neutral lines, and said reversing DPDT comprising AC live and neutral terminals for connection to AC power and two pole terminals for connecting said load via said at least one of SPDT and DPDT manual switch.

3. The method according to claim 1, wherein said manually actuated poles are actuated by a key action selected from a group comprising push to lock, push to release, push-push, rocker, toggle, slide, rotate and combinations thereof and wherein said push is applied anywhere throughout the push surface of said key.

4. The method according to claim 1, wherein the manually actuated switch pole is at least one of a micro switch and a rocker switch and wherein said micro switch is actuated via a lever supported by a latching key of a push to lock and a push to release mechanism.

5. The method according to claim 1, wherein said hybrid switch is packaged into a casing size and shape fit for installation into a standard wall box using selectable decorative cover with key selected from a group comprising opaque, IR pass transparent, indicator transparent, indicator transparent window, IR pass window, color tinted and combinations thereof.

6. The method according to claim 1, wherein said hybrid switch further comprising electrical circuits selected from a group comprising a CPU, a memory, current drain sensor, current signal amplifier, status sensor, at least one optical transceiver with optical access for optical cable, RF transceiver with antenna, IR transceiver with open air access, bus line driver, at least one indicator driver, at least one said coil driver, at least one setting selector and combinations thereof;
the functions of said electrical circuits are selected from a group comprising responding to operating commands, operating said hybrid switch, processing one of current drain sensor and status sensor signal, calculating the power consumed by the load, propagating at least one way of bidirectional signals selected from a group comprising optical via said optical cable, IR in line of sight, RF via said antenna, electrical signal via said bus line driver and combinations thereof for communicating data selected from a group comprising receiving commands, response to commands, reporting at least one of said load status and the power consumed by said load and combinations thereof.

7. The method according to claim 6, wherein said current drain sensor is a low ohmic alloy structure attached to one of said manually and armature actuated poles for outputting a signal level corresponding to the current drained by said load.

8. The method according to claim 6, wherein two high ohmic resistors are each connected to each said contactors forming jointly a voltage divider for outputting a divider signal to said CPU for identifying a continuity between said load and said live AC terminal.

9. The method according to claim 6, wherein at least one of particulars and location of said load are set via one of said setting selector and downloaded to said memory.

10. The method according to claim 9, wherein every keying action for reversing the load status including a first keying of one of said manually actuated pole and said armature actuated pole reverses the status of said load to one of from on to off and off to on and initiates a first duration timer during which a repeat keying initiates an extended duration timer and a command to switch one of on and off a cluster of given loads and a following keying during the extended duration timer initiates a command to switch one of on and off to all the given loads of a given home automation;
particulars and location of each given load of a cluster of loads and of all the given loads connected via one of a grid and network of said given home automation are one of set via said setting selector and downloaded to said memory;
each said command to switch one of on and off said cluster and said all the given loads is a command to correspond with said first reverse status of said load propagated via said one of grid and network selected from a group comprising optical cable, RF, IR in line of sight, bus line and combinations thereof and includes internal control of said one of armature actuated single and dual poles to maintain the reversed status of said load during said first and said extended timer duration.

11. The method according to claim 1, wherein each of a plurality of hybrid switches selected from a group comprising SPDT, DPDT and combinations thereof are combined into a given casing size and wherein each said manual actuating key and said coil with one of magnetic latching and non-latching armature of said combinations are integrated for selectively actuating said hybrid switches as selected from a group comprising all together, in groups, individually and combinations thereof.

12. The hybrid switch according to claim 1, wherein each of a plurality of hybrid switches selected from a group comprising SPDT, DPDT and combinations thereof are combined into a given casing size and wherein each said manual actuating key and said coil with one of magnetic latching and non-latching armature of said combinations are integrated for selectively actuating said hybrid switches as selected from a group comprising all together, in groups, individually and combinations thereof.

13. An hybrid switch for switching on-off at least one load via at least one manually actuated switch pole linked to at least one armature actuated pole via at least two contactors, said hybrid switch is selected from a group comprising SPDT including two contactors each with dual contacts, DPDT including four contactors each with dual contacts and reversing DPDT including two contactors each with triple reversing contacts;
said hybrid switch for installation into one of electrical wall box and cabinet further comprising a manual actuating key, a coil with one of magnetic latching and non-latching armature and terminals selected from a group comprising at least one coil terminal for connection to a coil driver, at least one power terminal for connection to electric power feed, a single SPDT load terminal for direct connection to a load, two DPDT load terminals for direct connection to a load, and two DPDT reversing pole terminals for connection to a load via at least one of an SPDT and DPDT manual switch for switching said load on-off via one of said manual actuating key and driving power to said coil.

14. The hybrid switch according to claim 13, wherein said SPDT comprising AC live and neutral terminals for connection to AC power and one pole terminal for direct connection to said load via a switched live AC line, said DPDT comprising AC live and neutral terminals for connection to AC power and two pole terminals for direct connection to said load via switched live AC and neutral lines and said reversing DPDT comprising AC live and neutral terminals for connection to AC power and two pole terminals for connecting said load via said at least one of SPDT and DPDT manual switch.

15. The hybrid switch according to claim 13, wherein said manually actuated poles are actuated by a key action selected from a group comprising push to lock, push to release, push-push, rocker, toggle, slide, rotate and combinations thereof and wherein said push is applied anywhere throughout the push surface of said key.

16. The hybrid switch according to claim 13, wherein the manually actuated switch pole is at least one of a micro switch and a rocker switch and wherein said micro switch is actuated via a lever supported by a latching key of a push to lock and a push to release mechanism.

17. The hybrid switch according to claim 13, wherein said hybrid switch is packaged into a casing size and shape fit for installation into a standard wall box using selectable decorative cover with key selected from a group comprising opaque, IR pass transparent, indicator transparent, indicator transparent window, IR pass window, color tinted and combinations thereof.

18. The hybrid switch according to claim 13, wherein said hybrid switch further comprising electrical circuits selected from a group comprising a CPU, a memory, current drain sensor, current signal amplifier, status sensor, at least one optical transceiver with optical access for optical cable, RF transceiver with antenna, IR transceiver with open air access, bus line driver, at least one indicator driver, at least one said coil driver, at least one setting selector and combinations thereof;
  the functions of said electrical circuits are selected from a group comprising responding to operating commands, operating said hybrid switch, processing one of current drain sensor and status sensor signal, calculating the power consumed by the load, propagating at least one way of bidirectional signals selected from a group comprising optical via said optical cable, IR in line of sight, RF via said antenna, electrical via said bus line driver and combinations thereof for communicating data selected from a group comprising receiving commands, response to commands, reporting said load status, reporting the power consumed by said load and combinations thereof.

19. The hybrid switch according to claim 18, wherein said current drain sensor is a low ohmic alloy structure attached to one of said manually and armature actuated poles for outputting a signal level corresponding to the current drained by said load.

20. The hybrid switch according to claim 18, wherein two high ohmic resistors are each connected to one of said contactors forming jointly a voltage divider for outputting a divider signal to said CPU for identifying a continuity between said load and said live AC terminal.

21. The hybrid switch according to claim 18, wherein at least one of particulars and a location of said load are set via one of said setting selector and downloaded to said memory.

22. The hybrid switch according to claim 21, wherein every keying action for reversing the load status including a first keying of one of said manually actuated pole and said armature actuated pole reverses the status of said load to one of from on to off and from off to on and initiates a first duration timer during which a repeat keying propagates a command to switch one of on and off a cluster of given loads and initiates an extended duration timer during which a repeat keying propagates a command to switch one of on and off all the given loads of a given home automation;
  particulars and location of each given load of a cluster of loads and of all the given loads connected via one of a grid and network of said given home automation are one of set via said setting selector and downloaded to said memory;
  each said command to switch one of on and off said cluster and said all the given loads is a command to correspond with said first reverse status of said load propagated via said one of grid and network selected from a group comprising optical cable, RF, IR in line of sight, bus line and combinations thereof and includes internal control of said one of armature actuated single and dual poles to maintain the reversed status of said load during said first and said extended timer duration.

23. The hybrid switch according to claim 13, wherein said at least two contactors are contact structures of a relay and a switch linked by one of a printed circuit board.

* * * * *